(12) United States Patent
Matsuda et al.

(10) Patent No.: US 10,447,035 B2
(45) Date of Patent: Oct. 15, 2019

(54) ELECTRIC POWER CREATION CONTROL SYSTEM AND METHOD

(71) Applicant: Hitachi, Ltd., Tokyo (JP)

(72) Inventors: Akiko Matsuda, Tokyo (JP); Seiji Inagaki, Tokyo (JP); Tohru Watanabe, Tokyo (JP); Masao Tsuyuzaki, Tokyo (JP); Masato Utsumi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 691 days.

(21) Appl. No.: 14/770,963

(22) PCT Filed: Feb. 27, 2013

(86) PCT No.: PCT/JP2013/055260
§ 371 (c)(1),
(2) Date: Aug. 27, 2015

(87) PCT Pub. No.: WO2014/132371
PCT Pub. Date: Sep. 4, 2014

(65) Prior Publication Data
US 2016/0013645 A1    Jan. 14, 2016

(51) Int. Cl.
*H02J 3/00* (2006.01)
*G05B 15/02* (2006.01)
(Continued)

(52) U.S. Cl.
CPC .............. *H02J 3/00* (2013.01); *G05B 15/02* (2013.01); *G06Q 10/06* (2013.01); *G06Q 50/06* (2013.01)

(58) Field of Classification Search
CPC ........ G05B 15/02; G06Q 10/06; G06Q 50/06; H02J 3/00
See application file for complete search history.

(56) References Cited

U.S. PATENT DOCUMENTS 4,754,391 A * 6/1988 Suzuki ................. G05B 13/024
700/37
6,681,156 B1 * 1/2004 Weiss ..................... G06Q 40/04
700/291
(Continued)

FOREIGN PATENT DOCUMENTS

CN     1574537 A    2/2005
CN   101159046 A    4/2008
(Continued)

OTHER PUBLICATIONS

Extended European Search Report received in corresponding European Application No. 13876156.4 dated Oct. 1, 2016.
(Continued)

*Primary Examiner* — Kenneth M Lo
*Assistant Examiner* — Mohammad A Rahman
(74) *Attorney, Agent, or Firm* — Mattingly & Malur, P.C.

(57) ABSTRACT

A first profile of each of resources in which information about characteristics of the resources when creating negawatts by controlling operation of the resources and decreasing electric power consumption of the resources or creating posiwatts by increasing the electric power consumption of the resources, and information about contract content between an aggregator and a relevant consumer are described, and a first control scenario for each electric power trading form in which control content of the resources to decrease the electric power consumption is described are stored; a resource group composed of a plurality of resources is generated by combining the resources so that the negawatts or posiwatts which satisfy conditions of a trading target electric power product can be created, on the basis of the first profile of each resource; a control scenario is selected; and each of the resources constituting the generated resource group is controlled accordingly.

18 Claims, 15 Drawing Sheets

(51) Int. Cl.
*G06Q 10/06* (2012.01)
*G06Q 50/06* (2012.01)

(56) References Cited

U.S. PATENT DOCUMENTS

| | | | |
|---|---|---|---|
| 7,249,043 B1* | 7/2007 | Trout, II | G06Q 10/06 |
| | | | 705/7.25 |
| 7,333,880 B2 | 2/2008 | Brewster et al. | |
| 8,169,186 B1* | 5/2012 | Haddad | B60L 11/1835 |
| | | | 180/14.3 |
| 9,727,071 B2* | 8/2017 | Steven | G05F 1/66 |
| 2004/0254899 A1 | 12/2004 | Abe et al. | |
| 2005/0209951 A1* | 9/2005 | Aron | G06Q 30/06 |
| | | | 705/37 |
| 2009/0326726 A1* | 12/2009 | Ippolito | H02J 3/14 |
| | | | 700/291 |
| 2011/0182597 A1* | 7/2011 | Motoyama | G03G 15/5004 |
| | | | 399/37 |
| 2012/0046957 A1* | 2/2012 | Cragun | G06Q 30/06 |
| | | | 705/1.1 |
| 2012/0150359 A1* | 6/2012 | Westergaard | H02J 3/14 |
| | | | 700/291 |
| 2013/0079941 A1* | 3/2013 | Lin | H05B 37/0245 |
| | | | 700/291 |
| 2013/0116842 A1* | 5/2013 | Saito | H02J 13/00 |
| | | | 700/291 |
| 2013/0226316 A1* | 8/2013 | Duchene | G05B 15/02 |
| | | | 700/17 |
| 2013/0311236 A1* | 11/2013 | Takahashi | G06Q 10/06 |
| | | | 705/7.31 |
| 2015/0088576 A1* | 3/2015 | Steven | G06Q 50/06 |
| | | | 705/7.22 |
| 2015/0094968 A1* | 4/2015 | Jia | G06Q 40/04 |
| | | | 702/60 |
| 2016/0294215 A1* | 10/2016 | Kudo | H02J 3/32 |

FOREIGN PATENT DOCUMENTS

| | | |
|---|---|---|
| JP | 2001-243358 A | 9/2001 |
| JP | 2004-336890 A | 11/2004 |
| JP | 2012-043164 A | 3/2012 |
| JP | 2012-165513 A | 8/2012 |

OTHER PUBLICATIONS

Kenji Yokoyama, "Activites as Negawatt Aggregator", Proceeding of the 2012 IEICE Communication Society Conference 2, Aug. 28, 2012, SS-23.
International Search Report of PCT/JP2013/055260.
Communication Pursuant to Article 94(3) EPC received in corresponding European Application No. 13 876 156.4 dated Feb. 4, 2019.

* cited by examiner

| Electric Power Product 1 | | |
|---|---|---|
| Advance Notice Time | | D10 |
| Lamp Period | | D11 |
| Quantity | | D12 |
| Start Time | | D13 |
| Randamaiji | | D14 |
| Duration | | D15 |
| Price | | D16 |
| Location | | D17 |

55

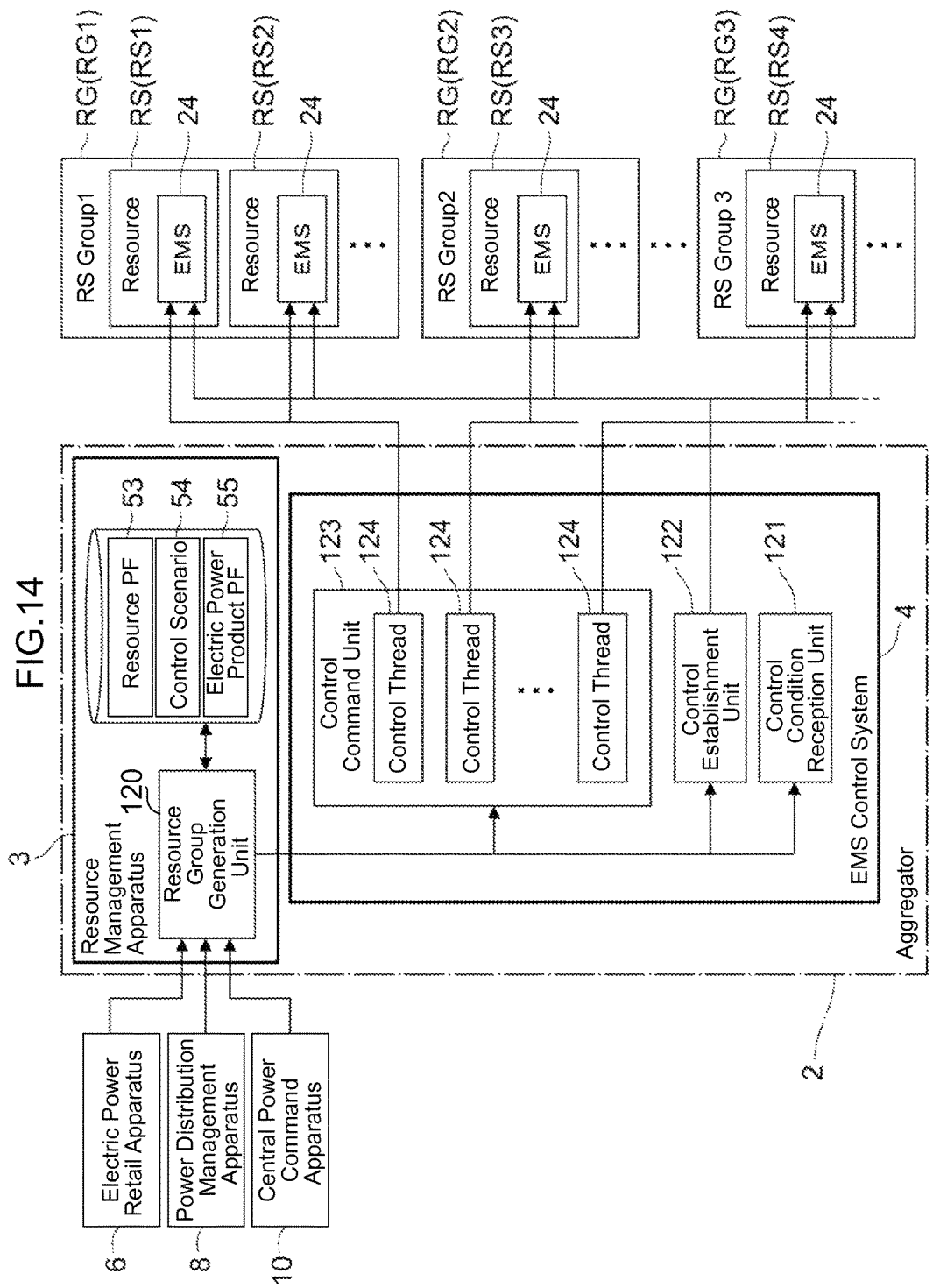

ELECTRIC POWER CREATION CONTROL SYSTEM AND METHOD

TECHNICAL FIELD

The present invention relates to an electric power creation control system and method and is suited for use in, for example, an electric power trading system.

BACKGROUND ART

A demand response means changes of an electric power consumption pattern so that consumers will temporarily refrain from the use of electric power, by means of changes of electric rates or payments of remuneration at the time of a rise in wholesale market prices or degradation of system reliability. In the electric power trading market such as the U.S., not only electric power generated by power plants, but also electric power called "negawatts" created by the demand response is traded.

Moreover, in recent years, traders called "aggregators" who organize negawatts of small-scaled consumers and deal with electric power companies and system operators have appeared. There are growing concerns about destabilization of electric power demand balance and expansion of volatility of electric power prices due to expansion of the electric power generation by regenerated energy; and in that sense as well, effective utilization of the negawatts as organized by the aggregators is expected.

Normally, an aggregator enters into a contract called a "demand response program" with consumers or another aggregator who organizes consumers in order to create the negawatts. When the consumers complete registrations to join the DR program, it becomes possible for the aggregator to use these consumers' equipment as resources to create the negawatts.

CITATION LIST

Patent Literature

[PTL 1] Description of U.S. Pat. No. 7,333,880

SUMMARY OF INVENTION

Problems to be Solved by the Invention

Meanwhile, a created amount of negawatts, time responsiveness until the creation of negawatts, and time responsiveness until the creation of negawatts (reduction of the electric power consumption) affects the life vary normally depending on the condition of the consumers' buildings, areas, and machine types and installment conditions of the equipment owned by the consumers.

On the other hand, buyers of the electric power in the electric power market have various demands, so that it is a very time-consuming and very cumbersome work to examine how the equipment of each consumer having the above-mentioned various characteristics should be used to create the negawatts that would meet the buyers' demands.

Therefore, if the negawatts which meet the various demands in the electric power market can be created easily in a short time and provided to the electric power market, it must be possible to suppress destabilization of the electric power demand balance and expansion of volatility of the electric power prices due to expansion of the electric power generation by the regenerated energy.

Furthermore, for example, wind power generation and photovoltaic power generation are highly dependent on the weather and how much electric power can be generated cannot be forecasted accurately. In this case, if the electric energy of the regenerated energy which is generated by, for example, the wind power generation and the photovoltaic power generation is more than forecasted, leaving that state as it is could cause various faults.

Accordingly, when the electric energy of the regenerated energy is more than forecasted, for example, it would be possible to further suppress destabilization of the electric power demand balance and expansion of volatility of the electric power prices due to expansion of the electric power generation by the regenerated energy if an electric power product that assumes the excessive amount of the electric energy could be provided in the electric power market by, for example, increasing the consumers' electric power consumption.

However, it is difficult to forecast the electric power production of the regenerated energy; and when providing the above-described electric power product to the electric power market, some ingenuity is required to be capable of promptly providing the electric power product according to the excessive amount of electric energy that will change from hour to hour.

The present invention was devised in consideration of the above-described circumstances and aims at suggesting an electric power creation control system and method capable of suppressing destabilization of the electric power demand balance and expansion of volatility of the electric power prices.

Means for Solving the Problems

In order to solve the above-described problems, provided according to the present invention is an electric power creation control system for creating electric power by controlling operation of resources of each consumer who has made a contract with an aggregator, wherein the electric power creation control system includes: a storage device that stores a profile of each of the resources, in which information about characteristics of the resources when creating negawatts, by decreasing electric power consumption of the resources or creating posiwatts, by increasing the electric power consumption of the resources, and information about contract content between the aggregator and the relevant consumer are described, and a control scenario for each electric power trading form in which control content of the resources to decrease or increase the electric power consumption is described; a resource group generation unit that generates a resource group composed of the plurality of resources by combining the resources so that the negawatts or posiwatts which satisfy conditions of a trading target electric power product can be created, on the basis of the profile of each resource; a control scenario selection unit that selects the control scenario corresponding to the trading form of the electric power product; and a control unit that controls each of the resources constituting the resource group generated by the resource group generation unit in accordance with the control scenario selected by the control scenario selection unit; wherein the conditions of the electric power product include at least: a quantity that is electric energy of the electric power product; start time of a time slot to sell the electric power product; and a lamp period that is a period of time from the start time until the electric energy reaches the quantity; wherein the profile describes the lamp period which is a period of time from the electric power consumption actually starts to decrease or increase until a decreased amount or an increased amount of the electric power consumption reaches a target value; and wherein the resource group generation unit generates the resource group based on the profile of each of the resources." This amendment is made along with the amendments of claim 1 on page 36 and claim 6 on page 38 of claims and their grounds are as described in section (3) below.

Furthermore, the present invention provides an electric power creation control method executed at an electric power creation control system for creating negawatts by controlling operation of resources configured of equipment of each consumer who has made a contract with an aggregator, wherein the electric power creation control system includes a storage device that stores a profile of each of the resources, in which information about characteristics of the resources when creating negawatts by decreasing electric power consumption of the resources or creating posiwatts by increasing the electric power consumption of the resources, and information about contract content between the aggregator and the relevant consumer are described, and a control scenario for each electric power trading form in which control content of the resources to decrease the electric power consumption is described, wherein the electric power creation control method includes: a first step executed by the electric power creation control system generating a resource group composed of the plurality of resources by combining the resources so that the negawatts or posiwatts which satisfy conditions of a trading target electric power product can be created, on the basis of the first profile of each resource and selecting the control scenario corresponding to the trading form of the electric power product; and a second step executed by electric power creation control system controlling each of the resources constituting the generated resource group in accordance with the selected control scenario; wherein the conditions of the electric power product include at least: a quantity that is electric energy of the electric power product; start time of a time slot to sell the electric power product; and a lamp period that is a period of time from the start time until the electric energy reaches the quantity; wherein the profile describes the lamp period which is a period of time from the electric power consumption actually starts to decrease or increase until a decreased amount or an increased amount of the electric power consumption reaches a target value; and wherein in the first step, the electric power creation control system generates the resource group based on the profile of each of the resources.

Advantageous Effects of Invention

According to the present invention, it is possible to realize the electric power creation control system and method capable of easily creating the negawatts or the posiwatts, which meet various demands in the electric power market, in a short time and providing them to the electric power market, and thereby suppressing destabilization of the electric power demand balance and expansion of volatility of the electric power prices.

BRIEF DESCRIPTION OF DRAWINGS

FIG. 14 is a block diagram illustrating a functional structure of the resource management apparatus and the EMS control system relating to negawatt creation control;

MODE FOR CARRYING OUT THE INVENTION

Figure 1:
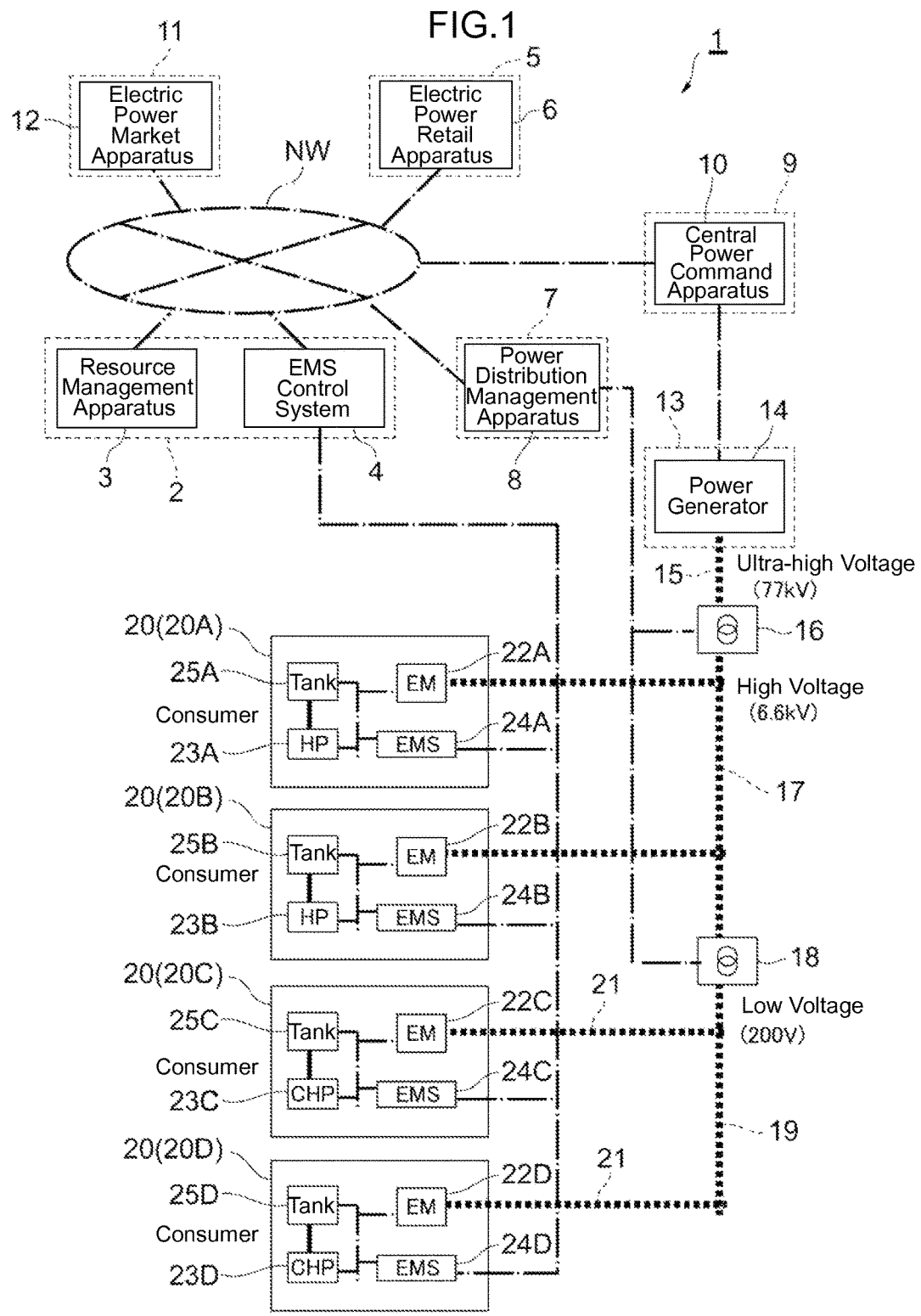
FIG. 1 is a block diagram illustrating an overall configuration of an electric power trading system according to this embodiment.

An embodiment of the present invention will be explained below in detail with reference to drawings.

(1) Outline of Electric Power Trading

An electric power trading market which is necessary background knowledge for the following descriptions will be firstly explained below.

The electric power trading market (hereinafter referred to as the "market") is a place where demand and supply of electric power are matched. There are, for example, a spot market where electricity to be delivered the next day is traded, futures market or forward market where electricity to be delivered on any day after the next day is traded, and an imbalance market where electricity to be delivered on that day is traded.

In the market, electricity to be delivered in one day is divided into 30-minute time periods (hereinafter referred to as the "time frames") and is traded for each of 48 time frames. Market participants tender bids to sell or purchase electric power by designating the price and quantity with respect to one or more time frames. The bids for sale or purchase are matched and contracted by the Zaraba method or the Itayose method. Unless a reverse trade is entered, a seller of the electric power assumes the obligation to supply the contracted quantity of electricity during a delivery term and a buyer of the electric power assumes the obligation to pay the amount of money calculated by multiplying the contracted quantity by the contracted price as they execute the contract.

The contracted price in the market (hereinafter referred to as the "electric power price") fluctuates from hour to hour depending on the situation of supply and demand of the electric power. Normally, the electric power price of daytime time slots on weekdays is high and the electric power price on holidays and during night-time hours is low. Moreover, the electric power price becomes high at midsummer or midwinter when the demand for cooling and heating is high. The electric power price also becomes high when the prices of petroleum oil, coals, and natural gas which are required for electric power generation increase. The electric power price also becomes high in a case of sudden maintenance or accidents of power plants. Furthermore, when wind power generation and photovoltaic power generation account for a large share of the electric power generation, the electric power price changes according to wind strength and weather forecast.

Attention is focused on the negawatts created by the demand response in order to deal with such fluctuations of the electric power price. As an example, assuming that a certain consumer has concluded a long-term contract to purchase the electric power and a sudden increase of demand on the next day is forecasted because of a fierce cold wave and the electric power price for delivery on the next day rises sharply, the consumer who has the long-term contract at that time can buy the electric power at a contracted price, but can keep the electric power consumption lower than the contracted electric energy (hereinafter referred to as the "contracted electric energy") by, for example, using oil stoves instead of air conditioners. The negawatts which are the thus-obtained difference between the contracted electric energy and the electric power consumption can be sold at a high price in the market and the consumer can thereby earn large profits. If the number of consumers like the above-described consumer increases, the demand balance will be improved and an increase in the electric power price can be curbed to a certain extent.

Assuming, as another example, that there is a customer who has a heat pump hot water system with hot-water supply tanks (hereinafter referred to as the HP hot water supply system), the HP hot water supply system has a heat storage function and, therefore, it is possible to adjust operation time to a certain extent without impairing convenience. The HP hot water supply system is operated during the night time when the electric power price is low, in order to prepare for the demand for hot water supply during the daytime. For example, assuming that strong wind during the day time on the next day is forecasted one day and the electric power price for delivery during the day time on the next day falls sharply, the consumer can procure the electric power more inexpensively by suppressing the operation of the HP hot water supply system during the night time on that day (selling the suppressed amount of electric power) and operating the HP hot water supply system during the daytime on the next day (buying the amount of electric power to be used for the operation) when the electric power price falls sharply. Furthermore, it is also possible to procure the electric power, which is to be used for the operation during the night time on the next day, during the daytime on the next day. Contrarily, if the electric power price during the daytime on the next day rises sharply due to, for example, sudden maintenance of the power plant, it is possible to avoid procuring the electric power at a high price by adjusting the operation time.

In summary, if the electric power price of a time slot during which the HP hot water supply system is originally supposed to be operated is higher than that of another time slot, it is possible to make the procurement of the electric power advantageous by suppressing the operation during the time slot, during which the HP hot water supply system is originally supposed to be operated, and operating the HP hot water supply system during the time slot when the electric power price is low. Under this circumstance, either the time slot to suppress the operation or the time slot to operate the system may come first. Activation of such sale and purchase of negawatts based on the market mechanism may possibly result in stabilization of market prices.

Generally, consumers do not directly deal with the market, but an aggregator who organizes the consumers sells and buys the electric power as described above according to daily electric power prices and directly or indirectly (by informing the consumers) control the consumers' electrical machinery and apparatuses. The aggregator earns profits by themselves and pays remuneration to the consumers.

In order to realize the sale and purchase of such negawatts properly, it is important for the aggregator to be capable of creating the negawatts in the form that meets buyers' various demands. So, the present invention suggests a control system for creating negawatts in the form that meet the buyers' various demands. The details of such an electric power trading system to which the present invention is applied will be described below.

(2) Configuration of Electric Power Trading System According to this Embodiment

Referring to FIG. 1, the reference numeral 1 represents an electric power trading system according to this embodiment as a whole. This electric power trading system 1 is configured so that a resource management apparatus 3 and an EMS (Energy Management System) control system 4 which are owned by an aggregator 2, an electric power retail apparatus 6 owned by an electric power retailer 5, a power distribution management apparatus 8 owned by a power distribution management provider 7, a central power command apparatus 10 owned by a transmission system operator (TSO) 9, and an electric power market apparatus 12 retained by an electric power market company 11 are connected to each other via a network NW and the central power command apparatus 10 is connected to a power generator 14 of a power producer 13.

Under this circumstance, the power producer 13 is a business operator who generates the electric power; and the transmission system operator 9 is a business operator who transmits the electric power generated by the power generator 14 of the power producer 13. The aggregator 2 and the electric power retailer 5 are business operators who tender bids to buy the electric power in the electric power market and provide contract consumers with the purchased electric power; and the power distribution management provider 7 is a business operator who maintains and manages electricity distribution lines (hereinafter referred to as the electric wires).

The aggregator 2, the electric power retailer 5 and the power distribution management provider 7, and the transmission system operator 9: respectively access the electric power market apparatus 12 by using the resource management apparatus 3, the electric power retail apparatus 6, the power distribution management apparatus 8, or the central power command apparatus 10 which they own; and tender bids to sell or buy electric power products in the electric power market provided by the electric power market apparatus 12. For example, the central power command apparatus 10 tenders a bid to sell the electric power, which is generated by the power producer 13, in the electric power market, while the transmission system operator 9 monitors the voltage of its own transmission network; and when the voltage of the transmission network becomes lower than a default value due to, for example, an increase in the demand, the transmission system operator 9 tenders a bid to buy the electric power in the electric power market.

The electric power market apparatus 12 matches the bids to sell and buy the electric power products, which are performed via the resource management apparatus 3, the electric power retail apparatus 6, the power distribution management apparatus 8, or the central power command apparatus 10, with respect to each time frame and has a contract of electric power trading concluded. The electric power market apparatus 12 transmits the content of the contract as contract data to the relevant resource management apparatus 3, electric power retail apparatus 6, power distribution management apparatus 8, and/or central power command apparatus 10. Then, the central power command apparatus 10 generates the electric power in the quantity according to the contract by controlling the power generator 14 in accordance with the contract data.

The electricity generated by the power generator 14 is transmitted to an ultra-high voltage system 15 of an ultra-high voltage (reference voltage: 77 kV). Then, the voltage of the electricity transmitted to the ultra-high voltage system 15 is decreased by a substation 16 to a high voltage (reference voltage: 6.6 kV) and transmitted to a high voltage system 17; and the voltage of the electricity is further decreased by a pole transformer 18 to a low voltage (reference voltage: 200 V) and transmitted to a low-voltage electricity distribution line 19. Incidentally, the electricity of the reference voltage 6.6 kV is transmitted to, and consumed by, an industrial consumer 20A and a condominium consumer 20B; the electricity of the reference voltage 200 V is transmitted via a low-voltage electricity generation line 21 to, and consumed by, a commercial consumer 20C and a domestic consumer 20D. Under this circumstance, electric power consumption (received electric energy) of the industrial consumer 20A, the condominium consumer 20B, the commercial consumer 20C, and the domestic consumer 20D (hereinafter collectively referred to as the consumers 20 as necessary) is calculated by electric meters 22A to 22D installed at the consumers 20, respectively.

At each consumer 20, a heat source device 23A to 23D installed at that consumer 20 is controlled by an EMS 24A to 24D. Incidentally, it is assumed in the following descriptions that HP hot water supply systems are installed at the consumers 20A and 20B and cogeneration systems with hot water supply tanks (hereinafter referred to as the CHP (Combined Heat and Pump) systems) are installed at the consumers 20C and 20D. Therefore, the heat source devices 23A, 23B installed at the consumers 20 are heat pumps and the heat source devices 23C, 23D installed at the consumers 20C, 20D are CHP's.

The heat pump starts or stops operation as controlled by the EMS 22A, 22B, generates heat with the supplied electricity, and heats service water. Then, the hot water obtained by this heating is stored in a hot water supply tank 25A, 25B. Similarly, the CHP starts or stops operation as controlled by the EMS 22C, 22D and generates electricity and heat at the same time with gas supplied by a gas provider which is not shown in the drawing. Then, the then-generated electricity is supplied to the electrical machinery and apparatuses and the then-generated heat is used to heat the service water, and the hot water obtained by this heating is stored in the hot water supply tank 25D.

Figure 2:
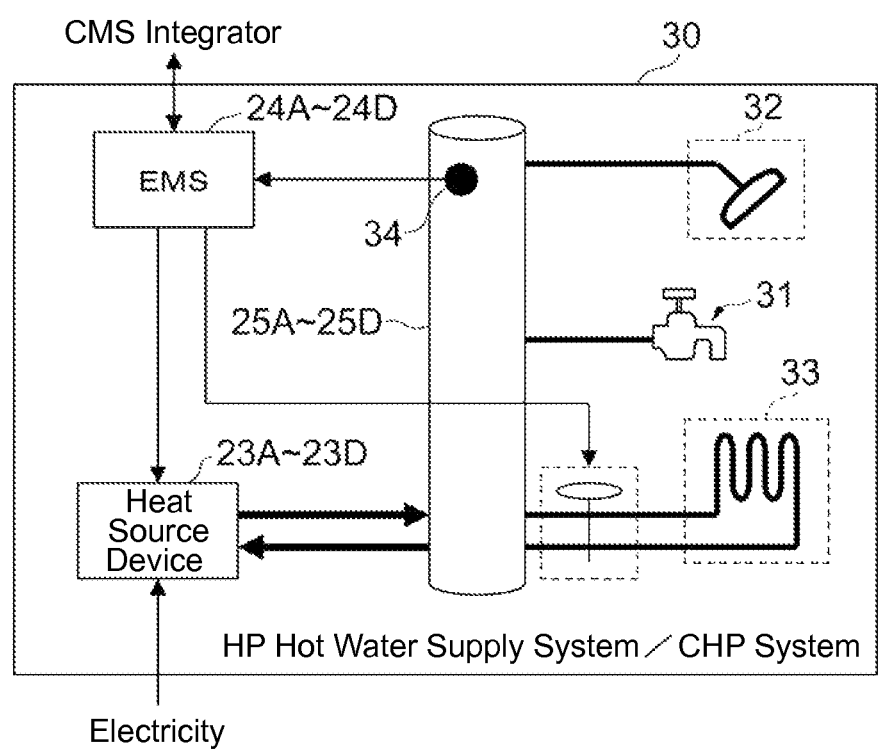
FIG. 2 is a schematic diagram schematically illustrating the configuration of an HP hot water supply system and a CHP system.

Incidentally, FIG. 2 illustrates a schematic configuration of the HP hot water supply system and the CHP system which are installed at the consumer 20. An HP hot water supply system/CHP system 30 is configured of the EMS's 24A to 24D, the heat source devices 23A to 23D, and the hot water supply tanks 25A to 25D.

The hot water obtained by having the heat source devices 23A to 23D heat the service water as described above is stored in the hot water supply tanks 25A to 25D. Then, the hot water stored in these hot water supply tanks 25A to 25D is supplied to a faucet 31 and shower equipment 32 in kitchens and washrooms and used as domestic water and also supplied to floor heating equipment 33 and used as a heating source for floor heating.

Furthermore, the EMS 24A to 24D: always monitors sensor outputs from a temperature sensor 34 provided at the hot water supply tank 25A to 25D and sensor outputs from a water temperature and water level sensor (not shown in the drawing) provided at the hot water supply tank; and controls the entire HP hot water supply system/CHP system 30 of the consumer 20 by operating or stopping the operation of the heat source devices 23A to 23D as necessary so that a certain amount of hot water of a constant temperature will be always stored in the hot water supply tanks 25A to 25D.

On the other hand, the aggregator 2 can create negawatts by controlling the EMS 22A to 22D of each consumer 20, who has registered participation in the demand response program, by using the EMS control system 4 as necessary and reducing the electric power consumption of the consumer 20 by reducing a flow rate of the hot water by using, for example, a stepping motor to operate a valve to adjust an operating rate of the heat source device 23A to 23D and the flow rate of the hot water supplied to the floor heating equipment 33, and stopping the operation of the heat source device 23. The EMS 24A to 24D is a device called "HEMS" and is equipped with a controller (control unit) function particularly in this embodiment. The heat source device 23A to 23D includes a controller (control unit) for controlling the operation status; and needless to say, the EMS 24A to 24D may implement control by designating a target control value to the controller (control unit) inside the heat source device.

Then, the aggregator 2 tenders a bit to sell the thus-created negawatts as an electric power product in the electric power market or accepts a bid to buy the electric power product from, for example, the electric power retailer 5 or the transmission system operator 9 and sell the negawatts as the electric power product.

Furthermore, the aggregator 2 can control the EMS 22A to 22D of each consumer 20, who has registered participation in the demand response program, by using the EMS control system 4 as necessary, and increase the electric power consumption of the consumer 20 by increasing the operating rate of the heat source devices 23A to 23D and the flow rate of the hot water supplied to the floor heating equipment 33 and starting the operation of the stopped heat source device 23.

Then, for example, when more electric power than forecasted is generated by, for example, wind turbine generators of the power producer 13, the aggregator 2 sells the electric power consumption (hereinafter referred to as the posiwatts), which is intentionally created as described above, as the electric power product to the transmission system operator 9.

Figure 3:
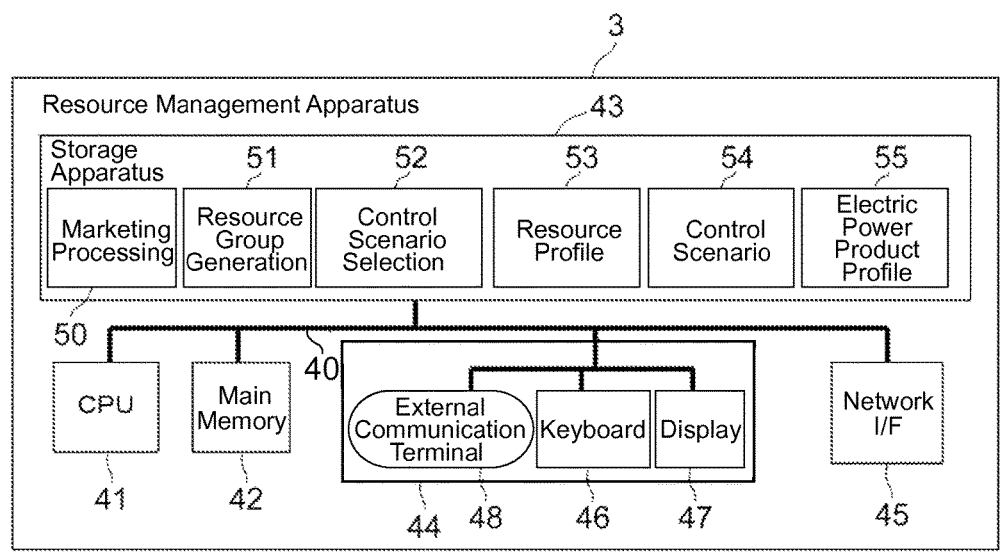
FIG. 3 is a block diagram illustrating the configuration of a resource management apparatus.

FIG. 3 illustrates a specific configuration example of the resource management apparatus 3. This resource management apparatus 3 is configured by including a CPU 41, a main memory 42, a storage apparatus 43, an input/output interface 44, and a network interface 45 which are connected to each other via an internal bus 40.

The CPU 41 is a processor that controls the operation of the entire resource management apparatus 3. Furthermore, the main memory 42 is used as a work memory of the CPU 41. The storage apparatus 43 is composed of mass storage devices such as hard disk drives and stores various programs and various pieces of information. As programs required for activation of the resource management apparatus 3 and for each processing are read from the storage apparatus 43 to the main memory 42 and the programs are executed by the CPU 41, various processing of the entire resource management apparatus 3 is executed.

The input/output interface 44 is an interface with a user of the resource management apparatus 3 and is composed of a keyboard 46, a display 47, and an external communication terminal 48. The display 47 is composed of, for example, a liquid crystal panel and the external communication terminal 48 is composed of, for example, a serial port pursuant to specified communication standards.

Furthermore, the network interface 45 is an interface to connect the resource management apparatus 3 to the network NW and is composed of, for example, an NIC (Network Interface Card). The resource management apparatus 3 communicates with other computer devices such as the EMS control system 4 and the electric power market apparatus 12, which are connected to the network NW, via this network interface 45.

In the case of this embodiment, the storage apparatus 43 of the resource management apparatus 3 stores: a marketing processing program 50, a resource group generation program 51, and a control scenario selection program 52 as programs; and one or more resource profiles 53, one or more control scenarios 54, and one or more electric power product profiles 55 as data.

The marketing processing program 50 is a program having a function that accesses the electric power market apparatus 12 and tenders a bid for sale or purchase in the electric power market. Moreover, the resource group generation program 51 is a program having a function that groups equipment of each consumer 20 as resources; and the control scenario selection program 52 is a program having a function that selects a control scenario 54 according to the corresponding electric power trading form.

Incidentally, as for the electric power trading form, there are, for example, a form in which all conditions of the electric power product such as the electric energy (kWh supplied per time frame when one frame is 30 minutes) and time slots are determined in advance to sell or buy the electric power, and a form in which part or whole of standby electric power which always exists is sold or bought by designating the quantity and time slots. In the former case, the aggregator 2 generates negawatts or posiwatts which match the electric power product traded only during the time slot(s) to deliver the electric power product; and in the latter case, the aggregator 2 always creates a creatable amount of negawatts and sells them in the electric power market.

The resource profile 53 is metadata in which, for example, information about characteristics of the resources and information about a demand response program contract executed between the aggregator 2 (FIG. 1) and the consumer 20 (FIG. 1) with respect to the relevant resource are described. This resource profile 53 is created for each resource of the consumer 20 with whom the aggregator 2 has executed the contract. The control scenario 54 is metadata in which the control content of the resource to create the negawatts or posiwatts to indicate how the operation of the resource should be controlled (by decreasing or increasing the electric power consumption) is described. This control scenario 54 is created in advance for each electric power trading form. Furthermore, the electric power product profile 55 is metadata in which the content of the electric power product that the aggregator 2 tenders a bid for sale in the electric power market is described. The details of the resource profile 53, the control scenario 54, and the electric power product profile 55 will be described later.

Figure 4:
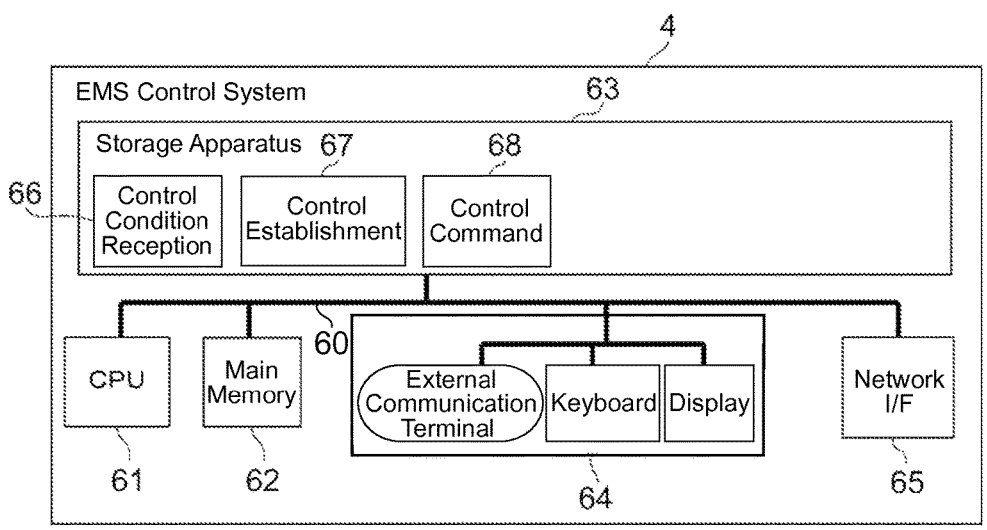
FIG. 4 is a block diagram illustrating the configuration of an EMS control system.

FIG. 4 illustrates a specific configuration example of the EMS control system 4. The EMS control system 4 is configured by including a CPU 61, a main memory 62, a storage apparatus 63, an input interface 64, and a network interface 65 which are connected to each other via an internal bus 60. Since the configuration and functions of the CPU 61, the main memory 62, the storage apparatus 63, the input interface 64, and the network interface 65 are similar to the corresponding parts of the resource management apparatus 3 (FIG. 3), an explanation about them is omitted here.

The storage apparatus 63 of the EMS control system 4 stores a control condition reception program 66, a control establishment program 67, and a control command program 68. The control condition reception program 66 is a program having a function that receives, for example, resource group information and data of the control scenario 54 (FIG. 3) which are transmitted from the resource management apparatus 3 as described later; and the control establishment program 67 is a program having a function that communicates with a necessary resource and establishes control over the resource. Moreover, the control command program 68 is a program having a function that transmits a necessary control command to the EMS 24A to 24D of the corresponding resource on the basis of the received resource group information and the data of the control scenario 54 and thereby controls the operation of that resource.

Figure 5:
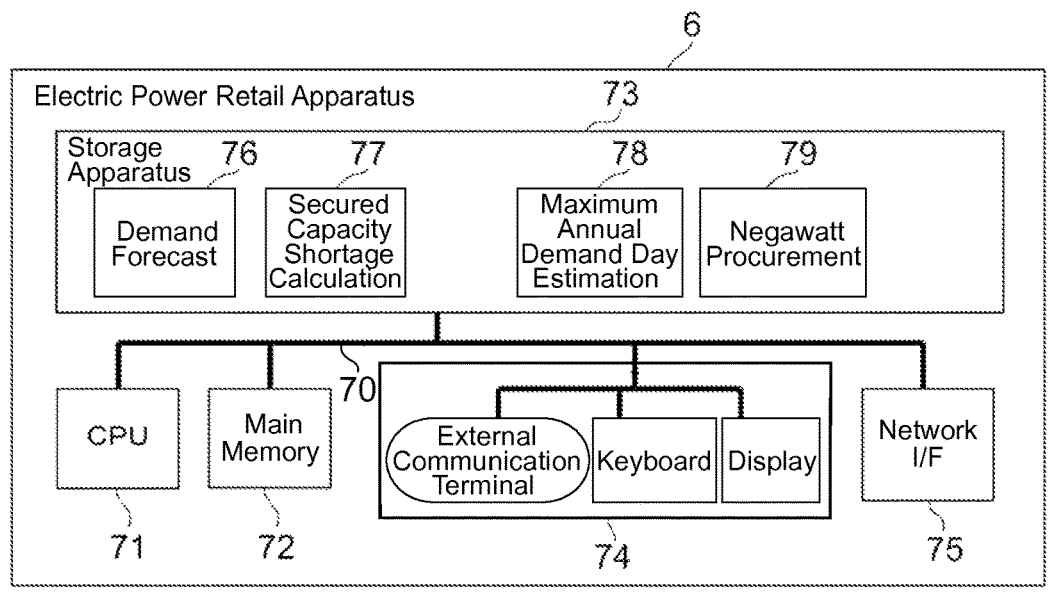
FIG. 5 is a block diagram illustrating the configuration of an electric power retail apparatus.

FIG. 5 illustrates a specific configuration example of the electric power retail apparatus 6. The electric power retail apparatus 6 is configured by including a CPU 71, a main memory 72, a storage apparatus 73, an input interface 74, and a network interface 75 which are connected to each other via an internal bus 70. Since the configuration and functions of the CPU 71, the main memory 72, the storage apparatus 73, the input interface 74 and the network interface 75 are similar to the corresponding parts of the resource management apparatus 3 (FIG. 3), an explanation about them is omitted here.

The storage apparatus 73 of the electric power retail apparatus 6 stores a demand forecast program 76, a secured capacity shortage calculation program 77, a maximum annual demand day estimation program 78, and a negawatt procurement program 79. The demand forecast program 76 is a program having a function that forecasts demanded electric energy for each time frame of the entire consumer 20, to whom the electric power should be provided, on the basis of the weather information and statistics in the past. Moreover, the secured capacity shortage calculation program 77 is a program having a function that calculates shortage of the currently secured electric energy with respect to the demanded electric energy for each time frame as calculated by the demand forecast program 76. Furthermore, the maximum annual demand day estimation program 78 is a program having a function that estimates a day when the electric power demand becomes maximum in the year on the basis of the weather information and statistics in the past. Then, the negawatt procurement unit is a program having a function that procures the insufficient electric power calculated by the secured capacity shortage calculation program 77 on a time frame basis by placing a bid for purchase in the electric power market.

Figure 6:
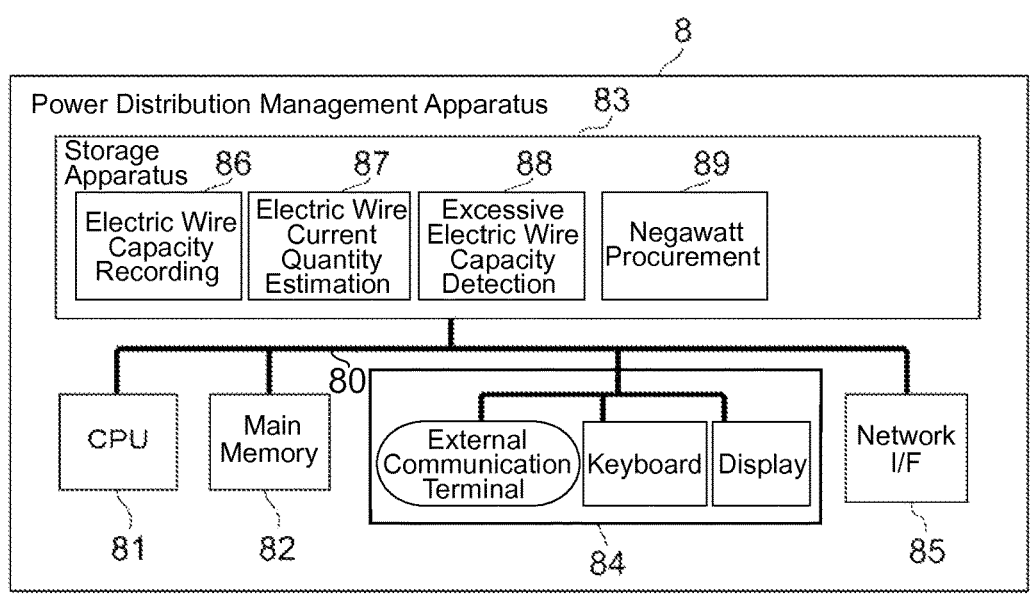
FIG. 6 is a block diagram illustrating the configuration of a power distribution management apparatus.

FIG. 6 illustrates a specific configuration example of the power distribution management apparatus 8. The power distribution management apparatus 8 is configured by including a CPU 81, a main memory 82, a storage apparatus 83, an input interface 84, and a network interface 85 which are connected to each other via an internal bus 80. Since the configuration and functions of the CPU 81, the main memory 82, the storage apparatus 83, the input interface 84 and the network interface 85 are similar to the corresponding parts of the resource management apparatus 3 (FIG. 3), an explanation about them is omitted here.

The storage apparatus 83 of the power distribution management apparatus 8 stores an electric wire capacity recording program 86, an electric wire current quantity estimation program 87, an excessive electric wire capacity detection program 88, and a negawatt procurement program 89. The electric wire capacity recording program 86 is a program having a function that records the capacity of electric wires for each area in a table not shown in the drawing; and the electric wire current quantity estimation program 87 is a program having a function that estimates the quantity of an electric current flowing through the electric wires with respect to each area. Moreover, the excessive electric wire capacity detection program 88 is a program having a function that detects whether the quantity of the electric current flowing through the relevant electric wire exceeds the capacity of the electric wire or not; and the negawatt procurement program 89 is a program having a function that tenders a bid to buy the excess amount of the electric current (electric power) in the electric power market with respect to the area, regarding which the excessive electric wire capacity detection program 88 determines that the quantity of the electric current flowing through the electric wire exceeds the capacity of that electric wire.

Figure 7:
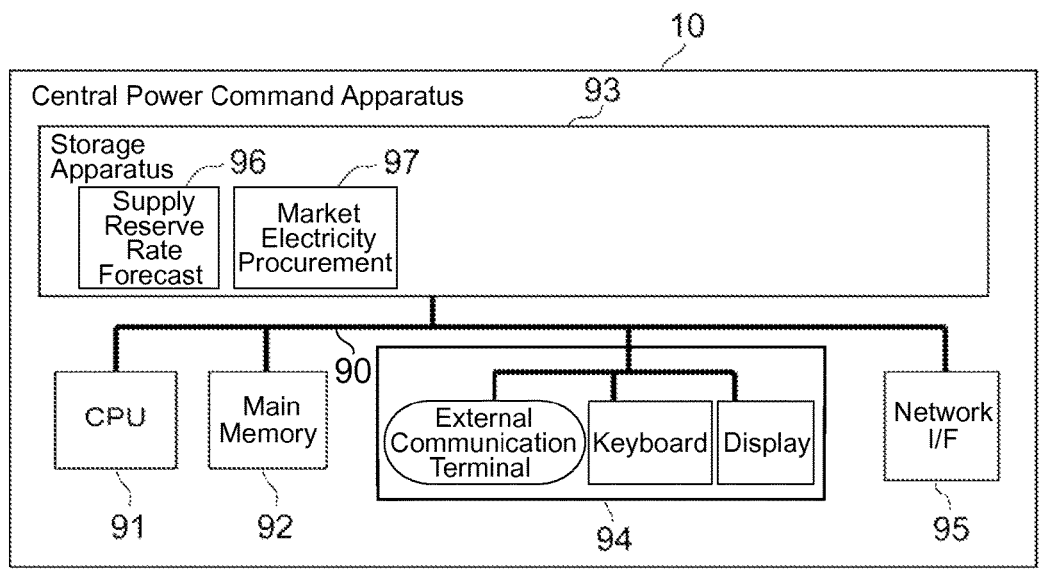
FIG. 7 is a block diagram illustrating the configuration of a central power command apparatus.

FIG. 7 illustrates a specific configuration example of the central power command apparatus 10. The central power command apparatus 10 is configured by including a CPU 91, a main memory 92, a storage apparatus 93, an input interface 94, and a network interface 95 which are connected to each other via an internal bus 90. Since the configuration and functions of the CPU 91, the main memory 92, the storage apparatus 93, the input interface 94, and the network interface 95 are similar to the corresponding parts of the resource management apparatus 3 (FIG. 3), an explanation about them is omitted here.

The storage apparatus 93 of the central power command apparatus 10 stores a supply reserve rate forecast program 96 and a market electricity procurement program 97. The supply reserve rate forecast program 96 is a program having a function that forecasts a supply reserve rate for each time frame on the basis of, for example, the weather information and statistics in the past. Normally, the transmission system operator 9 (FIG. 1) controls the power generator 14 of the power producer 13 to generate an excess amount of electric power (hereinafter referred to as the "emergency electric power") in excess of total electric energy determined by a contract between the electric power retailer 5 (FIG. 1) and the aggregator 2 (FIG. 1) (hereinafter referred to as the "total contracted electric power") in order to prepare for a case of an increase in the electric power demand. The supply reserve rate is a rate of the emergency electric power to the total contracted electric power. Furthermore, the market electricity procurement program 97 has a function that tenders a bid for purchase in the electric power market and procures the insufficient amount of electric power when the supply reserve rate becomes lower than a predetermined threshold value.

Figure 8:
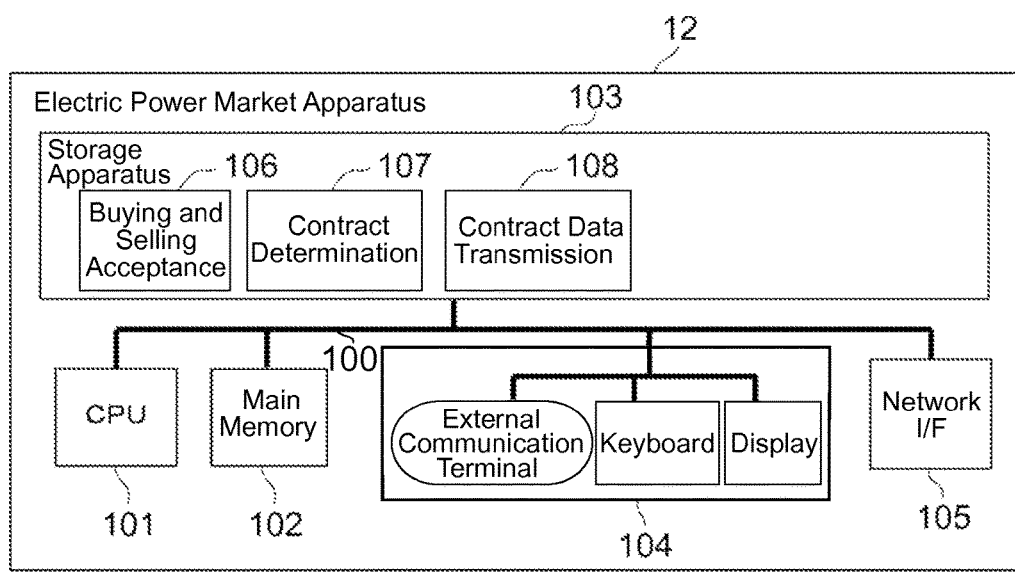
FIG. 8 is a block diagram illustrating the configuration of an electric power market apparatus.

FIG. 8 illustrates a specific configuration example of the electric power market apparatus 12. The electric power market apparatus 12 is configured by including a CPU 101, a main memory 102, a storage apparatus 103, an input interface 104, and a network interface 105 which are connected to each other via an internal bus 100. Since the configuration and functions of the CPU 101, the main memory 102, the storage apparatus 103, the input interface 104 and the network interface 105 are similar to the corresponding parts of the resource management apparatus 3 (FIG. 3), an explanation about them is omitted here.

The storage apparatus 103 of the electric power market apparatus 12 stores a buying and selling acceptance program 106, a contract determination program 107, and a contract data transmission program 108. The buying and selling acceptance program 106 is a program having a function that accepts a bid to sell or buy the electric power that is tendered by the resource management apparatus 3 (FIG. 1), the electric power retail apparatus 6 (FIG. 1), the power distribution management apparatus 8 (FIG. 1), and the central power command apparatus 10 (FIG. 1). Moreover, the contract determination program 107 is a program having a function that matches the bid to sell or buy the electric power by, for example, the Zaraba method or the Itayose method. Furthermore, the contract data transmission program 108 is a program having a function that transmits the contract content of electric power trading concluded by the contract determination program 107 as contract data to the resource management apparatus 3, the electric power retail apparatus 6, the power distribution management apparatus 8, and/or the central power command apparatus 10 which conducted the electric power trading.

Figure 9:
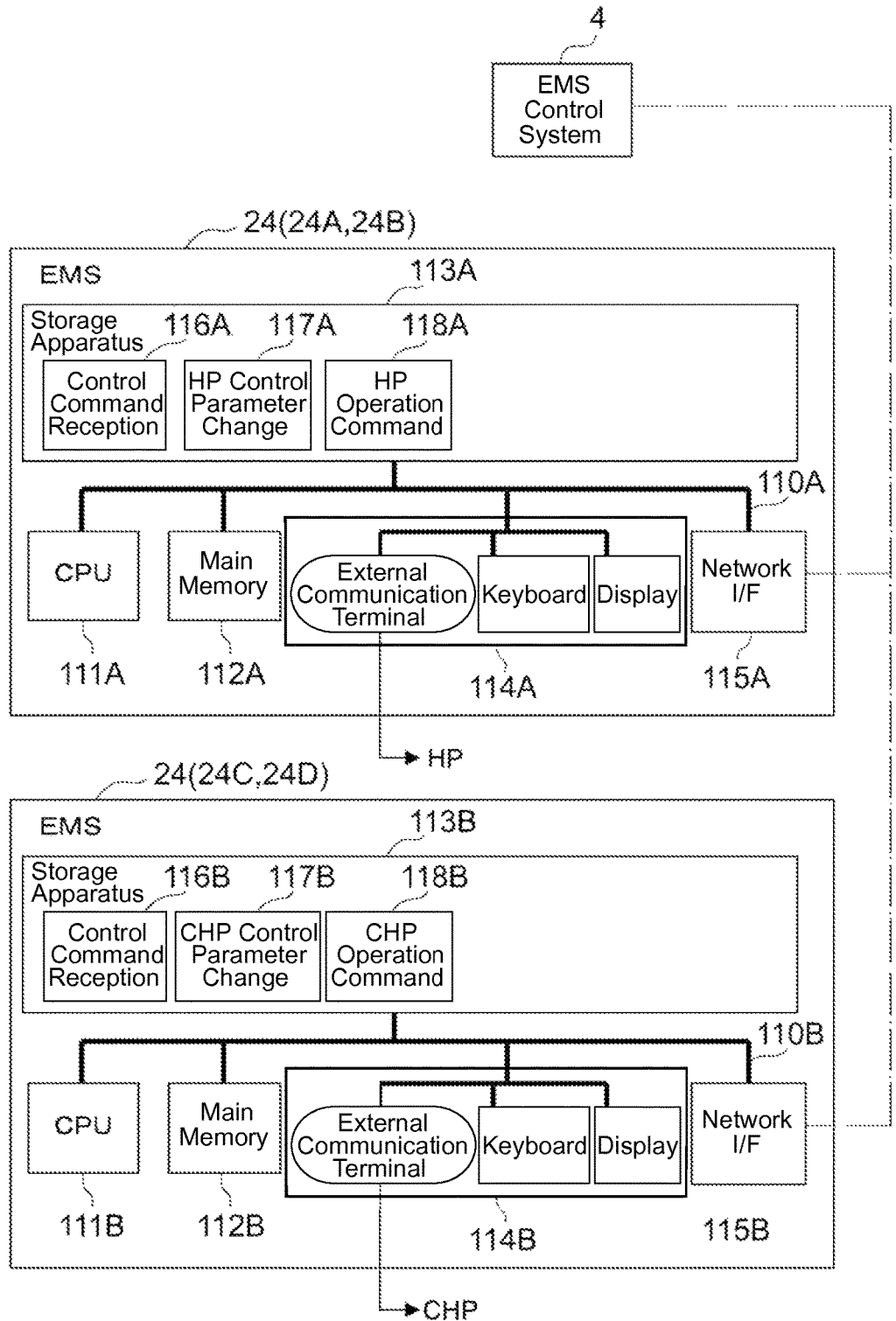
FIG. 9 is a block diagram illustrating the configuration of EMS's.

FIG. 9 illustrates a specific configuration example of the EMS's 24A to 24D installed at each consumer 20. An upper part of FIG. 9 illustrates a configuration example of the EMS's 24A, 24B installed at the consumer 20 where the HP hot water supply system is installed as the equipment (resource).

This EMS 24A, 24B is configured by including a CPU 111A, a main memory 112A, a storage apparatus 113A, an input interface 114A, and a network interface 115A which are connected to each other via an internal bus 110A. Since the configuration and functions of the CPU 111A, the main memory 112A, the storage apparatus 113A, the input interface 114A, and the network interface 115A are similar to the corresponding parts of the resource management apparatus 3 (FIG. 3), an explanation about them is omitted here.

The storage apparatus 113A of the EMS 24A, 24B stores a control command reception program 116A, an HP control parameter change program 117A, and an HP operation command program 118A. Of these programs, the control command reception program 116A is a program having a function that receives the control command transmitted from the control command program 68 (FIG. 4) of the EMS control system 4 as described earlier.

Moreover, the HP control parameter change program 117A is a program having a function that changes a control parameter for the heat pump or a control parameter for adjusting a flow rate of hot water supplied to the floor heating equipment 33 (FIG. 2) as necessary in accordance with the control command received by the control command reception program 116A. The operating rate of the heat pump (the operating rate of that resource) or the flow rate of the hot water supplied to the floor heating equipment 33 can be increased or decreased by changing the control parameters for the heat pump and the floor heating equipment 33. Furthermore, the HP operation command program 118A is a program having a function that stops or resumes the operation of the heat pump as necessary in accordance with the control command received by the control command reception program 116A.

Furthermore, a lower part of FIG. 9 illustrates a configuration example of the EMS's 24C, 24D installed at the consumer 20 where the CHP system is installed as the equipment (resource).

This EMS 24C, 24D is configured by including a CPU 111B, a main memory 112B, a storage apparatus 113B, an input interface 114B, and a network interface 115B which are connected to each other via an internal bus 110B. Since the configuration and functions of the CPU 111B, the main memory 112B, the storage apparatus 113B, the input interface 114B, and the network interface 115B are similar to the corresponding parts of the resource management apparatus 3 (FIG. 3), an explanation about them is omitted here.

The storage apparatus 113B of the EMS 24C, 24D stores a control command reception program 116B, a CHP control parameter change program 117B, and a CHP operation command program 118B. Of these programs, the control command reception program 116B is a program having a function that receives the control command transmitted from the control command program 68 (FIG. 4) of the EMS control system 4 as described earlier.

Moreover, the CHP control parameter change program 117B is a program having a function that changes a control parameter for the CHP or a control parameter for adjusting the flow rate of the hot water supplied to the floor heating equipment 33 (FIG. 2) as necessary in accordance with the control command received by the control command reception program 116B. The operating rate of the CHP (the operating rate of that resource) or the flow rate of the hot water supplied to the floor heating equipment 33 can be increased or decreased by changing the control parameters for the CHP and the floor heating equipment 33. Furthermore, the CHP operation command program 118B is a program having a function that stops or resumes the operation of the CHP as necessary in accordance with the control command received by the control command reception program 116B.

Incidentally, in the following descriptions, when it is unnecessary to particularly distinguish whether the equipment (resource) is the HP hot water supply system or the CHP system, the EMS 24A, 24B for the HP hot water supply system and the EMS 24C, 24D for the CHP system will be collectively referred to as the EMS 24.

Figure 10:
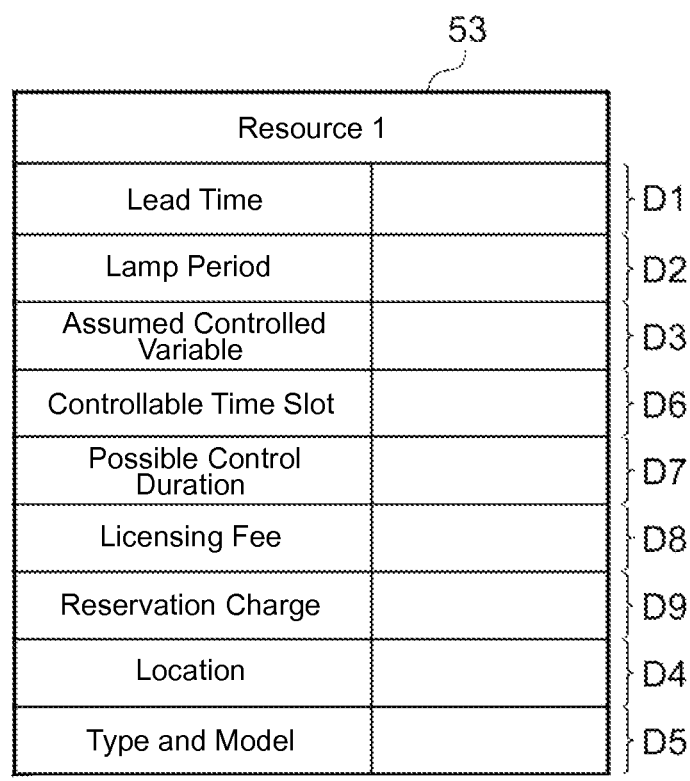
FIG. 10 is a conceptual diagram illustrating the structure of a resource profile.

FIG. 10 illustrates a configuration example of the resource profile 53 retained by the storage apparatus 43 (FIG. 3) of the resource management apparatus 3. The resource profile 53 includes: information D1 to D5 about characteristics of the relevant resource (the HP hot water supply system or the CHP system in this example) such as lead time, a lamp period, an assumed controlled variable, a location, and a type and model; and information D6 to D9 about the contract content of the demand response program executed between the aggregator 2 (FIG. 1) and the consumer 20 (FIG. 1) in relation to creation of negawatt or posiwatts by operating the resource, such as a controllable time slot, possible control duration, a licensing fee, and a reservation charge.

Of these pieces of information, the lead time (information D1) represents a period of time from controlling the operation of the relevant resource is started until the electric power consumption actually starts to decrease or increase (a period of time from when the control is started until creation of the negawatts or posiwatts is actually started); and the lamp period (information D2) represents a period of time from when the electric power consumption actually starts decreasing or increasing until an decreased amount (an amount of created negawatts) or an increased amount (an amount of created posiwatts) of the electric power consumption reaches a target value.

Moreover, the assumed controlled variable (information D3) represents the electric power consumption decreased or increased by controlling the operation of the relevant resource (the amount of created negawatts or posiwatts). Furthermore, the location (information D4) represents the location where the relevant resource is installed; and, for example, the address, latitude and longitude, an identifier of a substation which supplies electricity to the resource, an identifier of a power pole which supplies the electricity to the resource, and an identifier of an electric wire which supplies the electricity to the resource are applied. Furthermore, the type and model (information D5) represent the type and model of the resource.

The controllable time slot (information D6) represents a time slot during which the operation of the resource predetermined between the aggregator 2 and the consumer 20, who is the owner of that resource, can be controlled. Moreover, the possible control duration (information D7) represents a period of time during which the operation of the resource can be continuously controlled. This possible control duration is predetermined according to the type and model of the resource.

The licensing fee (information D8) represents a price per unit electric energy to be paid to the consumer 20 with respect to the negawatts or posiwatts created by the aforementioned operation control of the resource; and the reservation charge (information D9) represents a basic charge to be paid to the consumer 20 every time the operation control of the relevant resource is conducted.

Figure 11:
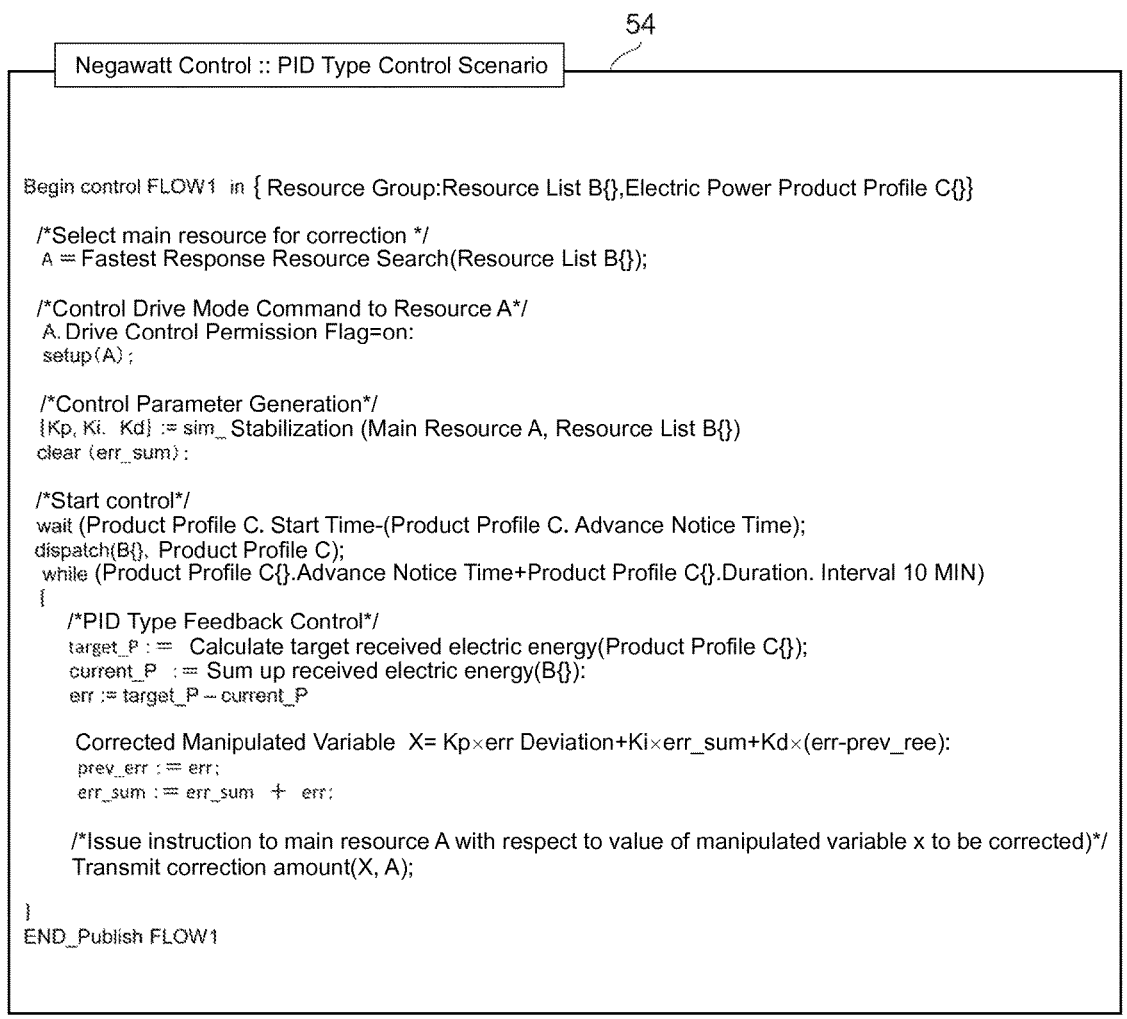
FIG. 11 is a program list illustrating a structure example of a control scenario.

On the other hand, FIG. 11 illustrates a specific configuration example of the control scenario 54 retained by the storage apparatus 43 (FIG. 3) of the resource management apparatus 3 as described earlier. The control scenario 54 shown in FIG. 11 is an example of a PID-type control scenario 54 relating to negawatt control.

This control scenario 54 defines control to create the negawatts that meet the definition of the electric power product in response to information of a resource group (a resource list B{ } which designates resources by means of an array) and designation of an electric power product profile (C{ }), by using the resources designated by the resource group. Under this circumstance, a resource of the fastest response speed among the resource group is searched from the list B{ } and is then identified as resource A. When the negawatts created by the entire resource group are inconsistent with the definition in the electric power product profile with respect to resource A, a definition (script above setup (A)) is made to issue a command to perform control driving to correct such inconsistency.

Furthermore, PID control parameters $K_p$, $K_i$, and $K_d$ to perform the correction are determined with reference to the resource list and the characteristics of resource A and by a gain control method by means of Nyquist diagram analysis (sim_stabilization (main resource A, resource list B{ })). After start time of negawatt delivery and before advance notice time, a suppression control command (dispatch (B{ }, product profile C)) is issued to each resource. Subsequently, PID-type feedback control of resource A is conducted every 10 minutes. Calculation of a corrected manipulated variable X by PID control by the aforementioned parameters Kp, Ki, and Kd is defined. Transmission of the calculated corrected manipulated variable X to resource A is defined.

Figures 12, 13:
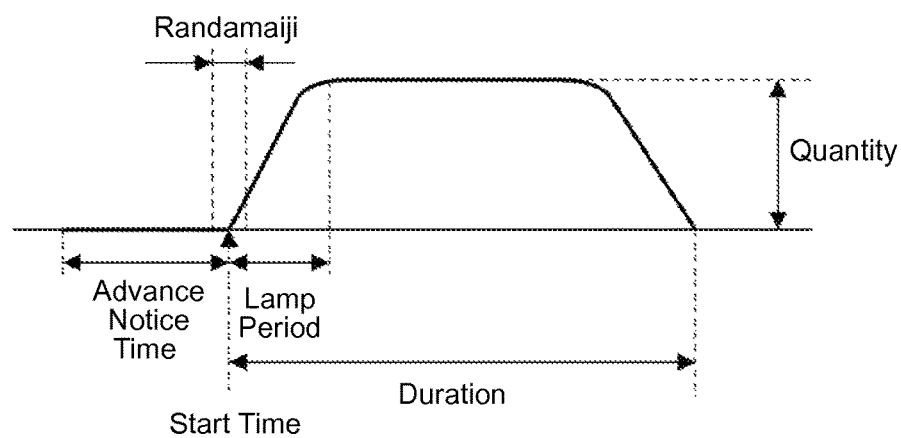
FIG. 12 is a conceptual diagram illustrating the structure of an electric power product profile.
FIG. 13 is a conceptual diagram for explaining the electric power product profile.

On the other hand, FIG. 12 illustrates a specific configuration example of the electric power product profile 55 retained by the storage apparatus 43 (FIG. 3) of the resource management apparatus 3 as described earlier. The electric power product profile 55 includes each information D10 to D17 relating to the advance notice time, lamp period, quantity, start time, randamaiji, duration, price, and location.

Of these pieces of information, the start time (information D13) represents start time of the time frame when the relevant electric power product is sold as shown in FIG. 13. Moreover, the advance notice time (information D10) represents time when the buyer should transmit a timing signal called "advance notice" (hereinafter referred to as the "advance notice signal") to the aggregator 2 before the start time; and the quantity (information D12) represents the electric energy of the electric power product. Moreover, the lamp period (information D11) represents a period of time from the start time of the electric power product until the electric energy reaches the "quantity" of the electric power product. Furthermore, the randamaiji (information D14) represents a range of time deviation between the start time and the time when the electric power of the electric power product is actually provided to the buyer.

Furthermore, the duration (information D15) represents duration of the electric power product (total time of the time frames during which the electric power product is provided); and the price (information D16) represents a unit price of the electric power product (electric rate per unit time) which the aggregator 2 desires. Furthermore, the location (information D17) represents the location where the aggregator 2 can provide the electric power product.

(3) Processing of Resource Management Apparatus and EMS Control System Relating to Creation of Negawatts or Posiwatts FIG. 14 illustrates a functional structure of the resource management apparatus 3 and the EMS control system 4 relating to negawatt creation control processing or posiwatt creation control processing executed by the resource management apparatus 3 and the EMS control system 4 when the aggregator 2 creates negawatts or posiwatts by means of the demand response. Referring to FIG. 14, the resource group generation unit 120 is a function generated by the CPU 41 executing the resource group generation program 51 which is read from the storage apparatus 43 of the resource management apparatus 3 described earlier with reference to FIG. 3 to the main memory 42. Moreover, the control condition reception unit 121, the control establishment unit 122, and the control command unit 123 are functions respectively generated by the CPU 61 executing the relevant control condition reception program 66, control establishment program 67, or control command program 68 which is read from the storage apparatus 63 of the EMS control system 4 described earlier with reference to FIG. 4 to the main memory 62.

When the aggregator 2 tenders a bid to sell the electric power product in the electric power market or the aggregator 2 accepts a bid, which has been submitted by, for example, the electric power retailer 5 (FIG. 1), the power distribution management provider 7 (FIG. 1), or the transmission system operator 9 (FIG. 1) to the electric power market, to buy the electric power product and the bid for sale or the bid for purchase is concluded, the resource group generation unit 120 of the resource management apparatus 3 examines how to combine resources RS which are capable of creating negawatts or posiwatts according to the contracted electric power product, that is, to decide which resource RS (RS1, RS2, and so on) and which resource RS should be combined to create the negawatts or posiwatts that satisfy all conditions of the contracted electric power product (hereinafter referred to as the "contracted electric power product").

When the contracted electric power product is the negawatts or posiwatts for which the aggregator 2 tendered the bid for sale in the electric power market, the above examination is conducted based on the electric power product profile 55 corresponding to the contracted electric power product and the resource profile 53 of each resource RS which can be used at that time; and when the contracted electric power product is the negawatts for which the aggregator 2 accepts the bid for purchase of the electric power product offered in the electric power market, the examination is conducted based on the content of the contracted electric power product, for which the aggregator 2 bids, and the resource profile 53 of each resource RS which can be used at that time. Incidentally, the content of the bid for sale and the bid for purchase as offered in the electric power market is the same as the content of the electric power product profile 55 described earlier with reference to FIG. 12.

Then, after the resource group generation unit 120 selects resource groups which should be combined as a result of the above-mentioned examination, it generates one resource group RG (RG1, RG2, and so on) from these groups and transmits identification information of the respective resources RS constituting the generated resource group RG as resource group information to the EMS control system 4. Moreover, the resource group generation unit 120 selects the control scenario 54 according to the electric power trading form of the contracted electric power product and transmits data of the selected control scenario 54 to the EMS control system 4. Consequently, after receiving the resource group information and the data of the control scenario 54, the control condition reception unit 121 of the EMS control system 4 stores them in the main memory 62 (FIG. 4).

On the other hand, after receiving the aforementioned advance notice signal from the buyer of the contracted electric power product before the advance notice time of the start time of the contracted electric power product, the resource group generation unit 120 transfers it to the EMS control system 4. Then, having received this advance notice signal, the control establishment unit 122 of the EMS control system 4 accesses the EMS's 24 of the respective resources RS constituting the relevant resource group RG on the basis of the resource group information, which is generated for the contracted electric power product and stored in the main memory 62, and then establishes control over the resources RS.

Furthermore, after the control establishment unit 122 establishes the control over each of the relevant resources RS as described above, the control command unit 123 of the EMS control system 4 generates a control thread 124 with respect to the electric power product. Consequently, the then generated control thread 124 controls the EMS's 24 of the respective resources RS constituting the resource group RG on the basis of the corresponding resource group information and data of the control scenario 54 which are stored in the main memory 62, in accordance with the control scenario 54. As a result of the above-described processing, the negawatts or posiwatts according to the contracted electric power product are created.

Figure 15A:
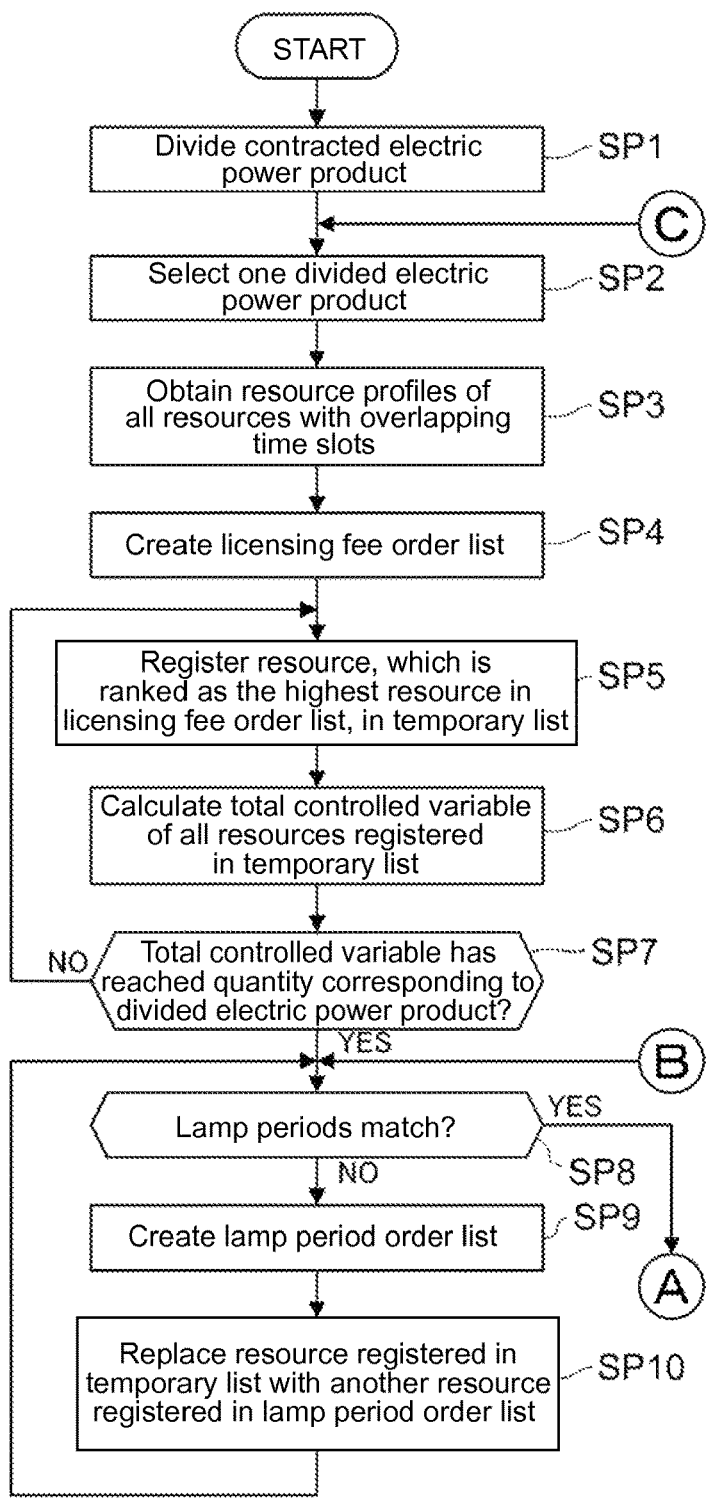
FIG. 15A is a flowchart illustrating a processing sequence for resource group generation processing.
Figure 15B:
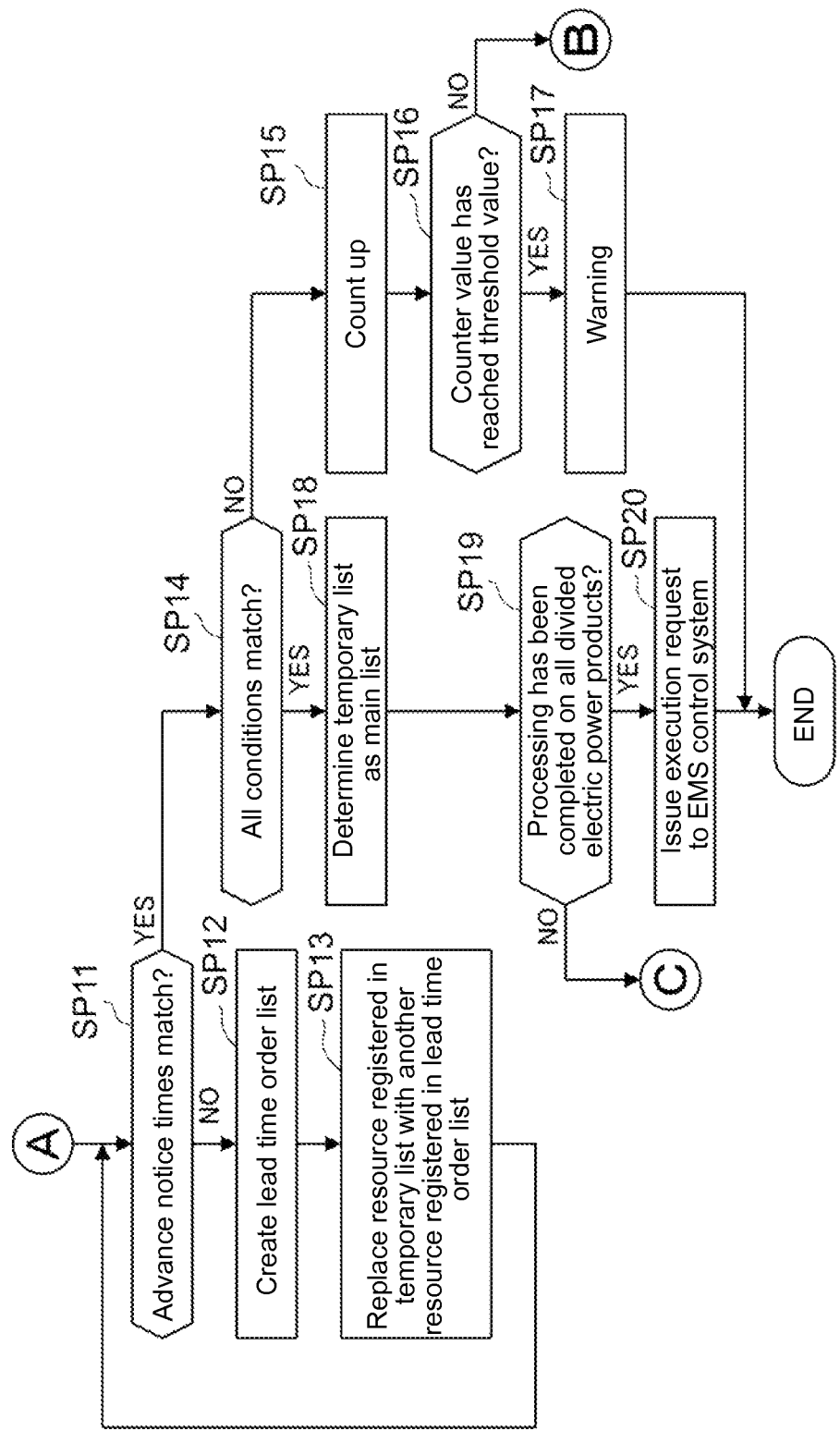
FIG. 15B is a flowchart illustrating the processing sequence for the resource group generation processing.

FIG. 15A and FIG. 15B illustrate a processing sequence for resource group generation processing executed by the resource group generation unit 120 of the resource management apparatus 3 from among the above-described negawatt creation control processing or posiwatt creation control processing. The resource group generation unit 120 generates a resource group RG by preferentially combining resources RS, which satisfy the respective conditions of the contracted electric power product (such as the advance notice time, the lead time, the lamp period, the quantity, and the time slot) and whose licensing fee is low, as the resource group RG for creating the negawatts or posiwatts in accordance with the processing sequence illustrated in FIG. 15A and FIG. 15B.

Practically, when a contract of the sale or purchase of the electric power product (negawatts or posiwatts) for which the aggregator 2 tendered the bid for sale in the electric power market is concluded or when a contract of the sale or purchase of the electric power product (negawatts or posiwatts) for which the aggregator 2 accepts the bid in the electric power market is concluded, the resource group generation unit 120 starts the resource group generation processing illustrated in FIG. 15A and FIG. 15B and firstly resets a counter described later (hereinafter referred to as the "resource group generation processing counter"). Moreover, the resource group generation unit 120 then divides the contracted electric power product into a plurality of electric power products on the basis of time slots and/or electric energy (SP1) and selects one divided electric power product from the individual thus-obtained and divided electric power products (hereinafter referred to as the "divided electric power products") (SP2).

Subsequently, the resource group generation unit 120 reads the resource profiles 53 (FIG. 10) of all the resources (hereinafter referred to as the "candidate resources") RS (FIG. 14), whose operation can be controlled during the time slot(s) of the divided electric power product, from the resource profiles 53 (FIG. 3) stored in the storage apparatus 43 (FIG. 3) (SP3).

Next, the resource group generation unit 120 refers to each resource profile 53 read in step SP3 and creates a list in which the candidate resources RS are arranged in ascending order of licensing fees (hereinafter referred to as the "licensing fee order list") (SP4). Moreover, the resource group generation unit 120 resets a temporary list described later at the same time.

Furthermore, the resource group generation unit 120 registers a candidate resource RS, which is not registered in the temporary list and is ranked as the highest-rank candidate resource in the licensing fee list, in the temporary list from among the candidate resources RS registered in the licensing fee list created as described above (SP5).

Subsequently, the resource group generation unit 120 refers to the resource profile of each candidate resource RS registered in the temporary list, calculates a total value of assumed controlled variables (see FIG. 10) of these candidate resources RS as a total controlled variable of the respective candidate resources RS registered in the temporary list (SP6), and then judges whether or not the total controlled variable calculated in step SP6 has reached the quantity according to the relevant divided electric power product, which is larger than the quantity of the divided electric power product by specified emergency electric energy (SP7).

If the resource group generation unit 120 obtains a negative result in this judgment, it returns to step SP5 and then repeats the processing from step SP5 to step SP7. Then, if the resource group generation unit 120 eventually obtains an affirmative result in step SP7 as the total controlled variable of the candidate resources RS registered in the temporary list reaches the quantity according to the relevant divided electric power product, and generates one resource group RG (FIG. 14) by using all the candidate resources RS registered in the temporary list, the resource group generation unit 120 judges whether or not the lamp period of the negawatts or posiwatts created by the entire resource group RG matches the lamp period of the divided electric power product (SP8).

If the resource group generation unit 120 obtains a negative result in this judgment, it creates a list by arranging the candidate resources RS, which are registered in the licensing fee list, in ascending order of their lamp periods (hereinafter referred to as the "lamp period order list") (SP9).

Subsequently, when the resource group generation unit 120 generates one resource group RG by using all the candidate resources RS registered in the temporary list, it replaces one candidate resource RS registered in the temporary list with another candidate resource RS registered in the lamp period order list so that the lamp period of the negawatts or posiwatts created by the entire resource group RG becomes closer to the lamp period of the divided electric power product (SP10).

Specifically speaking, when the resource group generation unit 120 generates one resource group RG by using all the candidate resources RS registered in the temporary list in step SP10 and the lamp period of the negawatts or posiwatts created by the entire resource group RG is shorter than the lamp period of the divided electric power product, the resource group generation unit 120 selects a candidate resource RS of the shortest lamp period as a replacement target from among the candidate resources RS registered in the temporary list. In the following descriptions, the candidate resource RS selected as the replacement target will be referred to as the "replacement target resource RS." Then, the resource group generation unit 120: selects a candidate resource RS whose assumed controlled variable is the same or almost the same as that of the replacement target resource RS, whose lamp period is longest, and whose licensing fee is lowest when the lamp period is the same, from among the candidate resources RS which are registered in the lamp period order list, but are not registered in the temporary list; and registers the selected candidate resource RS in the temporary list by replacing the replacement target resource RS with it.

Furthermore, when the resource group generation unit 120 generates one resource group RG by using all the candidate resources RS registered in the temporary list in step SP10 and the lamp period of the negawatts or posiwatts created by the entire resource group RG is longer than the lamp period of the divided electric power product, the resource group generation unit 120 selects a candidate resource RS of the longest lamp period as the replacement target resource RS from among the candidate resources RS registered in the temporary list. Then, the resource group generation unit 120: selects a candidate resource RS whose assumed controlled variable is the same or almost the same as that of the replacement target resource RS, whose lamp period is shortest, and whose licensing fee is lowest when the lamp period is the same, from among the candidate resources RS which are registered in the lamp period order list, but are not registered in the temporary list; and registers the selected candidate resource RS in the temporary list by replacing the replacement target resource RS with it.

Subsequently, the resource group generation unit 120 returns to step SP8; and when the resource group generation unit 120 generates one resource group RG by using all the candidate resources RS registered in the temporary list, it judges again whether or not the lamp period of the negawatts or posiwatts created by the entire resource group RG matches the lamp period of the divided electric power product (SP8).

Then, if the resource group generation unit 120 obtains a negative result in this judgment, it subsequently repeats the processing from step SP8 to step SP10. When the resource group generation unit 120 generates one resource group RG by using all the candidate resources RS registered in the temporary list by repeating the above-described processing, the lamp period of the negawatts or posiwatts created by the entire resource group RG becomes closer to the lamp period of the divided electric power product.

Then, if the resource group generation unit 120 eventually obtains an affirmative result in step SP8 and generates one resource group RG by using all the candidate resources RS registered in the temporary list, it judges whether or not the advance notice time of the negawatts or posiwatts created by the entire resource group RG matches the advance notice time of the divided electric power product (SP11).

If the resource group generation unit 120 obtains a negative result in this judgment, it creates a list of the candidate resources RS, which are registered in the licensing fee list, but are not registered in the temporary list, by arranging them in ascending order of their lead times (hereinafter referred to as the "lead time order list") (SP12).

Subsequently, when the resource group generation unit 120 generates one resource group by using all the candidate resources RS registered in the temporary list, it replaces one candidate resource RS registered in the temporary list with another candidate resource RS registered in the lamp period order list so that the advance notice time of the negawatts or posiwatts created by the entire resource group RG becomes closer to the advance notice time of the divided electric power product (SP13).

Specifically speaking, when the resource group generation unit 120 generates one resource group by using all the candidate resources RS registered in the temporary list in step SP13 and the advance notice time of the negawatts or posiwatts created by the entire resource group RG is shorter than the advance notice time of the divided electric power product, it selects a candidate resource RS of the shortest lead time as the replacement target resource RS from among the candidate resources RS registered in the temporary list. Then, the resource group generation unit 120: selects a candidate resource RS whose assumed controlled variable is the same or almost the same as that of the replacement target resource RS, whose lead time is longest, and whose licensing fee is lowest when the lead time is the same, from among the candidate resources RS which are registered in the lead time order list, but are not registered in the temporary list; and registers the selected candidate resource RS in the temporary list by replacing the replacement target resource RS with it.

Furthermore, when the resource group generation unit 120 generates one resource group by using all the candidate resources RS registered in the temporary list in step SP13 and the advance notice time of the negawatts or posiwatts created by the entire resource group RG is longer than the advance notice time of the divided electric power product, it selects a candidate resource RS of the longest lead time as the replacement target resource RS from among the candidate resources RS registered in the temporary list. Then, the resource group generation unit 120: selects a candidate resource RS whose assumed controlled variable is the same or almost the same as that of the replacement target resource RS, whose lead time is shortest, and whose licensing fee is lowest when the lead time is the same, from among the candidate resources RS which are registered in the lead time order list, but are not registered in the temporary list; and registers the selected candidate resource RS in the temporary list by replacing the replacement target resource RS with it.

Subsequently, the resource group generation unit 120 returns to step SP11; and when the resource group generation unit 120 generates one resource group by using all the candidate resources RS registered in the temporary list, it judges again whether or not the lead time of the negawatts or posiwatts created by the entire resource group RG matches the lead time of the divided electric power product (SP11).

If the resource group generation unit 120 obtains a negative result in this judgment, it then repeats the processing from step SP11 to step SP13. When the resource group generation unit 120 generates one resource group by using all the candidate resources RS registered in the temporary list by repeating the above-described processing, the lead time of the negawatts or posiwatts created by the entire resource group RG becomes closer to the lead time of the divided electric power product.

Then, if the resource group generation unit 120 eventually obtains an affirmative result in step SP11 and then generates one resource group by using all the candidate resources RS registered in the temporary list, it judges whether or not all the quantity, the lamp period, and the lead time of the negawatts or posiwatts created by the entire resource group RG match the quantity, the lamp period, and the lead time of the divided electric power product (SP14).

If the resource group generation unit 120 obtains a negative result in this judgment, it counts up the resource group generation processing counter by one (SP15) and then judges whether or not the count value of the resource group generation processing counter has reached a predetermined threshold value or not (SP16).

Under this circumstance, obtaining the negative result in this step SP16 means that the generation of the resource group RG capable of creating the negawatts or posiwatts whose quantity, lamp period, and lead time match those of the divided electric power product has failed, but the number of trials to generate such resource group RG has not reached a predefined number of times (the same number of times as the threshold value). Therefore, under this circumstance, the resource group generation unit 120 returns to step SP8 and then retries the processing of step SP8 and subsequent steps.

On the other hand, obtaining the negative result in step SP16 means that the generation of the resource group RG capable of creating the negawatts or posiwatts whose quantity, lamp period, and lead time match those of the divided electric power product has been executed the predefined number of times, but the generation of such resource group RG has failed. Consequently, under this circumstance, the resource group generation unit 120 notifies the aggregator 2 to that effect by, for example, displaying a warning on the display 47 (FIG. 3) (SP17) and then terminates this resource group generation processing.

On the other hand, if the resource group generation unit 120 obtains an affirmative result in the judgment of step SP14, it decides the then temporary list as a main list (SP18) and then judges whether the execution of the processing of step SP2 and subsequent steps on all the divided electric power products has been completed or not (SP19).

Then, if the resource group generation unit 120 obtains a negative result in this judgment, it returns to step SP2 and then repeats the processing of step SP2 and subsequent steps by switching the divided electric power product selected in step SP2 to another divided electric power product which has not been processed.

Then, if the resource group generation unit 120 eventually obtains an affirmative result in step SP19 by obtaining the main list of all the divided electric power products, the main list obtained as described above is used as the aforementioned resource group information and the resource group generation unit 120 transmits the resource group information and the data of the control scenario 54 (FIG. 11) to the EMS control system 4 and requests the EMS control system 4 to execute the demand response in accordance with the resource group information and the control scenario 54 (SP20). Then, the resource group generation unit 120 terminates this resource group generation processing.

(4) Flow of Negawatt Trading

Next, of the negawatt creation control processing and the posiwatt creation control processing by the resource management apparatus 3 and the EMS control system 4 as described above, the negawatt creation control processing will be explained below in more detail by referring to an example of a case in which the transmission system operator 9 (FIG. 1), the electric power retailer 5 (FIG. 1), or the power distribution management provider 7 (FIG. 1) tenders a bid to buy the electric power product in the electric power market and the aggregator 2 accepts the bid for purchase.

(4-1) Flow of Negawatt Trading Between Aggregator and Power Producer

The transmission system operator 9 generates the electric power in the quantity according to the total quantity of the electric energy agreed in advance with, for example, the aggregator 2 (FIG. 1), the electric power retailer 5 (FIG. 1), and the consumer; however, if the transmission system operator 9 assumes that the electric power of the supply reserve rate will become short as described above, it tenders a bid to buy the electric power product on a time frame basis in the electric power market.

Figure 16:
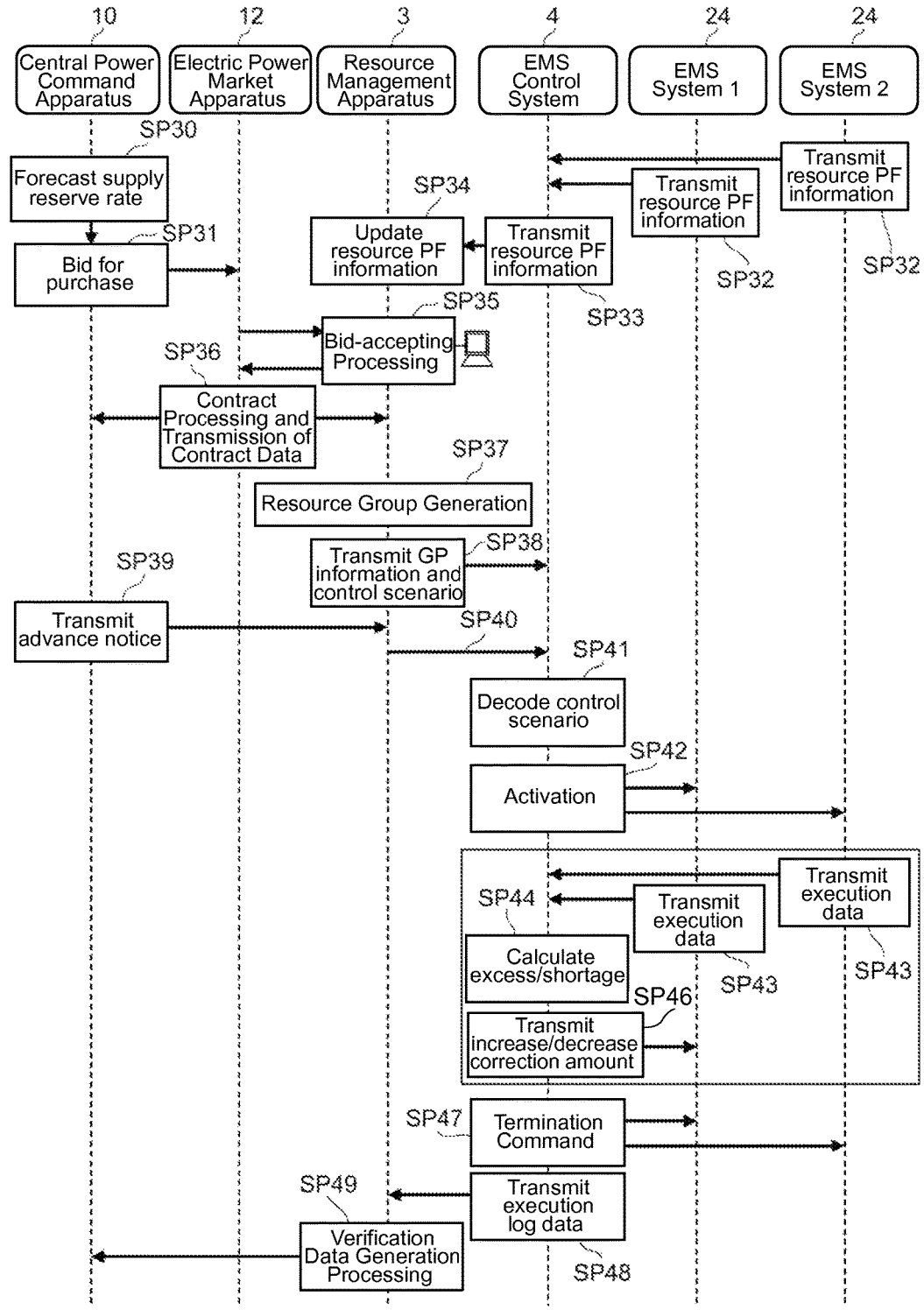
FIG. 16 is a tag chart illustrating a flow of negawatt trading between an aggregator and a transmission system operator.

FIG. 16 illustrates a flow of processing sequence executed when the transmission system operator 9 tenders a bid to buy the electric power product in the electric power market and the aggregator 2 accepts the bid for purchase.

The central power command apparatus 10 of the transmission system operator 9 calculates a forecast value of the supply reserve rate for each time frame based on, for example, weather information and statistics in the past and sequentially forecasts the supply reserve rate based on the calculated forecast value of the supply reserve rate for each time frame and the total electric energy of electric power products which have already been contracted and sold (SP30). Then, when the supply reserve rate becomes lower than a threshold value, the central power command apparatus 10 issues a bid to buy the electric power product to the electric power market apparatus 12 (SP31).

On the other hand, on the aggregator 2 side, the data of the resource profile 53 of the corresponding resource RS (FIG. 14) is transmitted from the EMS 24 installed at each consumer 20, who has registered participation in the demand response program, to the EMS control system 4 regularly (for example, everyday) (SP32). Incidentally, the resource profile 53 is regularly transmitted from each EMS 24 to the EMS control system 4 because physical characteristics of the resources RS change with the lapse of time.

Then, the EMS control system 4 transfers the received data of the resource profile 53 to the resource management apparatus 3 (SP33). Moreover, the resource management apparatus 3 updates the relevant resource file 53 with the latest information based on the transferred data of the resource profile 53 (SP34).

On the other hand, the resource management apparatus 3 always monitors bids to buy electric power products in the electric power market; and when the transmission system operator 9 tenders a bid to buy an electric power product as described above, the resource management apparatus 3 executes bid-accepting processing for placing the bid (accepting the bid) to sell the same electric power product with respect to the relevant bid for purchase (SP35).

Then, as a result of the bid acceptance by the aggregator 2, the electric power market apparatus 12 matches the bid for purchase of the electric power product from the transmission system operator 9 with the bid for sale by the aggregator 2 and executes contract processing for concluding a contract for the electric power trading. Moreover, the electric power market apparatus 12 transmits the content of the then contracted electric power product (the contracted electric power product) as contract data to the central power command apparatus 10 and the resource management apparatus 3 (SP36).

After receiving the contract data, the resource management apparatus 3 executes the resource group generation processing described earlier with reference to FIG. 15A and FIG. 15B and thereby generates a resource group RG by selecting one or more resources RS from among the resources RS whose operation can be controlled during the time slot of the contracted electric power product (the time slot for which the transmission system operator 9 purchases the electric power) (SP38).

Furthermore, the resource management apparatus 3 selects a control scenario 54, which should be used for that resource group RG, and transmits data of the selected control scenario 54 and the resource group information of the resource group RG generated as described above to the EMS control system 4 (SP38). Consequently, after receiving the resource group information and the data of the control scenario 54, the EMS control system 4 stores them in the main memory 62 (FIG. 4).

Subsequently, when the time point earlier than the start time of the contracted electric power product by the advance notice time comes, the central power command apparatus 10 transmits the aforementioned advance notice signal to the resource management apparatus 3 (SP39). Moreover, after receiving the advance notice signal, the resource management apparatus 3 transfers it to the EMS control system 4 (SP40).

Then, after receiving the advance notice signal, the EMS control system 4 decodes the relevant control scenario 54 stored in the main memory 62 (SP41) and executes activation to establish the control over the EMS 24 of each resource RS constituting the relevant resource group RG in accordance with the decoded control scenario 54 (SP42).

Consequently, the EMS 24 of each resource RS constituting the relevant resource group RG reduces the operating rate of the resource RS by changing the control parameters of the relevant resource RS in accordance with the command of the EMS control system 4. As a result, the electric power consumption of the resources RS is reduced, thereby creating the negawatts. Moreover, when this happens, the EMS 24 transmits the electric energy of the then created negawatts, which are recognized by referring to the electric meters 22A to 22D (FIG. 1), as execution data to the EMS control system 4 (SP43).

The EMS control system 4 calculates the total quantity of the then created negawatts (total electric energy) based on the execution data transmitted from each relevant EMS 24. Moreover, the EMS control system 4 compares the calculated total quantity of the negawatts with the quantity (electric energy) of the contracted electric power product and judges whether the total quantity of the then created negawatts matches the quantity of the contracted electric power product or not.

Then, if the EMS control system 4 determines that the total quantity of the then created negawatts does not match the quantity of the contracted electric power product (that is, the total quantity of the then created negawatts is more or less than the quantity of the contracted electric power product), it calculates the excessive or insufficient amount of the electric energy (SP44) and issues a command to the EMS(s) 24 of some or all the resources RS constituting the relevant resource group RG to change the control parameters of the resources RS again so as to reduce or increase the total quantity of the then created negawatts by the calculated amount of the electric energy (SP46).

On the aggregator 2 side, the above-described processing from step SP43 to step SP46 is repeated in cycles of 10 minutes after starting creating the negawatts with the relevant resource group RG. As a result, the total quantity of the negawatts created with respect to the resource group RG is controlled to match the quantity of the contracted electric power product during the time slot of the contracted electric power product.

Then, when the time slot of the contracted electric power product has eventually elapsed, the EMS control system 4 issues a command to the EMS 24 of each resource RS constituting the relevant resource group RG to return the control parameters of the relevant resource RS to the original parameters (that is, to return the operation status of that resource RS to the original state) (SP47) and then transmits log information of each piece of the execution data, which was transmitted from the relevant EMS 24 in step SP43 described above, as execution log data to the resource management apparatus 3 (SP48).

Furthermore, after receiving the execution log data, the resource management apparatus 3 executes verification data generation processing for generating verification data, which aggregate the execution log data for each time frame, and transmits the generated verification data to the central power command apparatus 10 (SP49). Consequently, the central power command apparatus 10 verifies whether the negawatts according to the aforementioned contracted electric power product, for which the bid for purchase was conducted, have been provided from the aggregator 2 or not, on the basis of the verification data transmitted from the resource management apparatus 3.

As a result, the negawatt trading between the transmission system operator 9 and the aggregator 2 terminates.

(4-2) Flow of Negawatt Trading Between Aggregator and Electric Power Retailer

The electric power retailer 5 (FIG. 1) forecasts demanded electric energy for each time frame of the entire consumer 20 as described above in order to resolve shortage of the secured capacity which becomes a problem when full-year secured electric energy for a capacity securement obligation which the electric power retailer 5 assumes (the obligation to secure the electric power required by the consumer, which whom it executes a contract, though the year) is less than the total quantity of electric energy, regarding which the electric power retailer 5 executes the contract with each consumer 20, and when the electric power to sell becomes insufficient for several days in the year; and when the electric power retailer 5 determines that the currently secured electric energy is insufficient for the forecasted demanded electric energy, it tenders a bid to buy the insufficient amount of electric energy in the electric power market. As a result, the advantage of power distribution cost sharing can be realized by suppressing the electric energy to be sold on a maximum demand day with respect to a power distribution cost sharing system by which a plurality of electric power retailers 5 are made to bear power distribution equipment cost in proportion to the electric energy to be sold on the annual maximum demand day.

Figure 17:
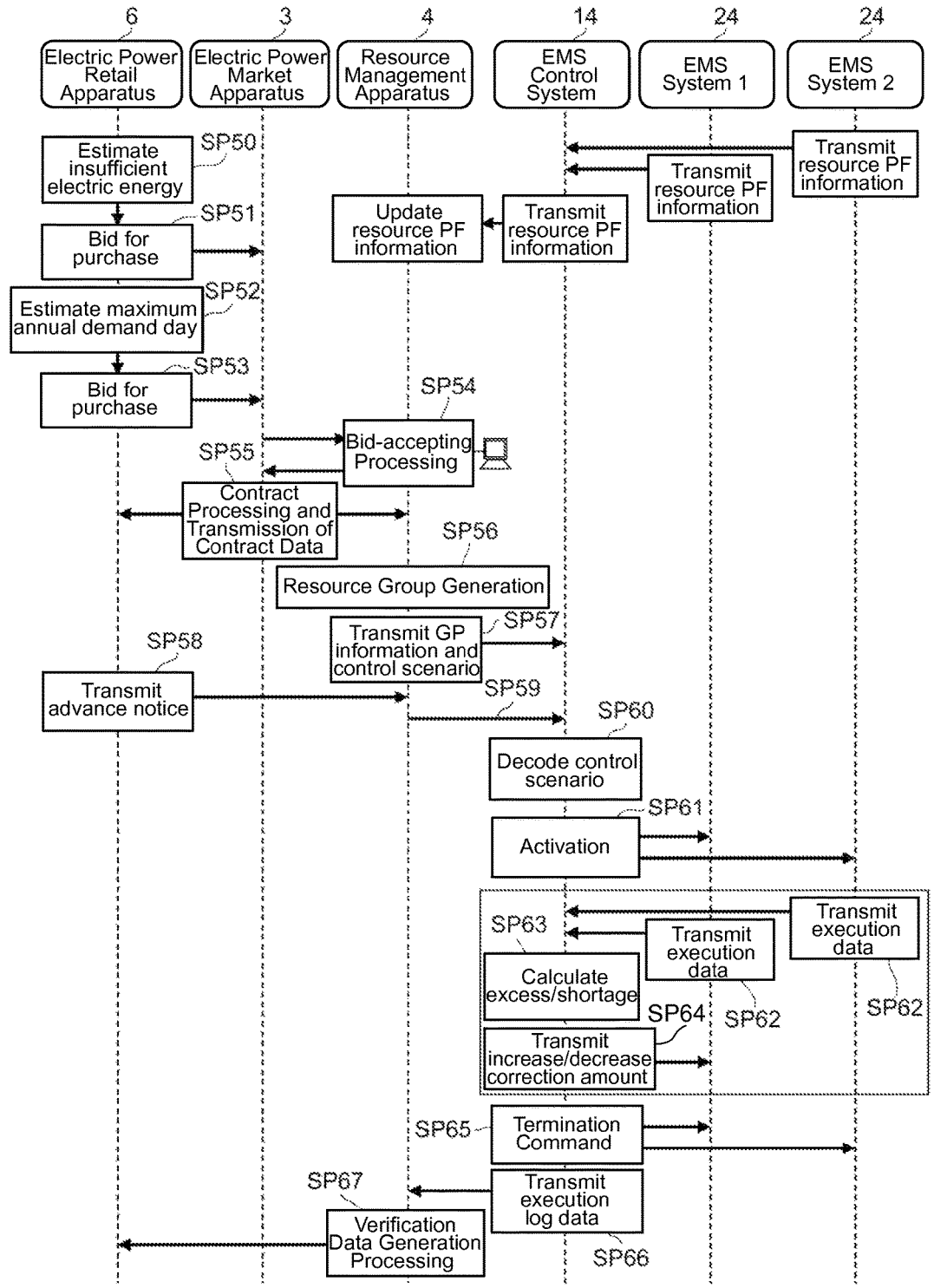
FIG. 17 is a tag chart illustrating a flow of negawatt trading between the aggregator and an electric power retailer.
Figure 18:
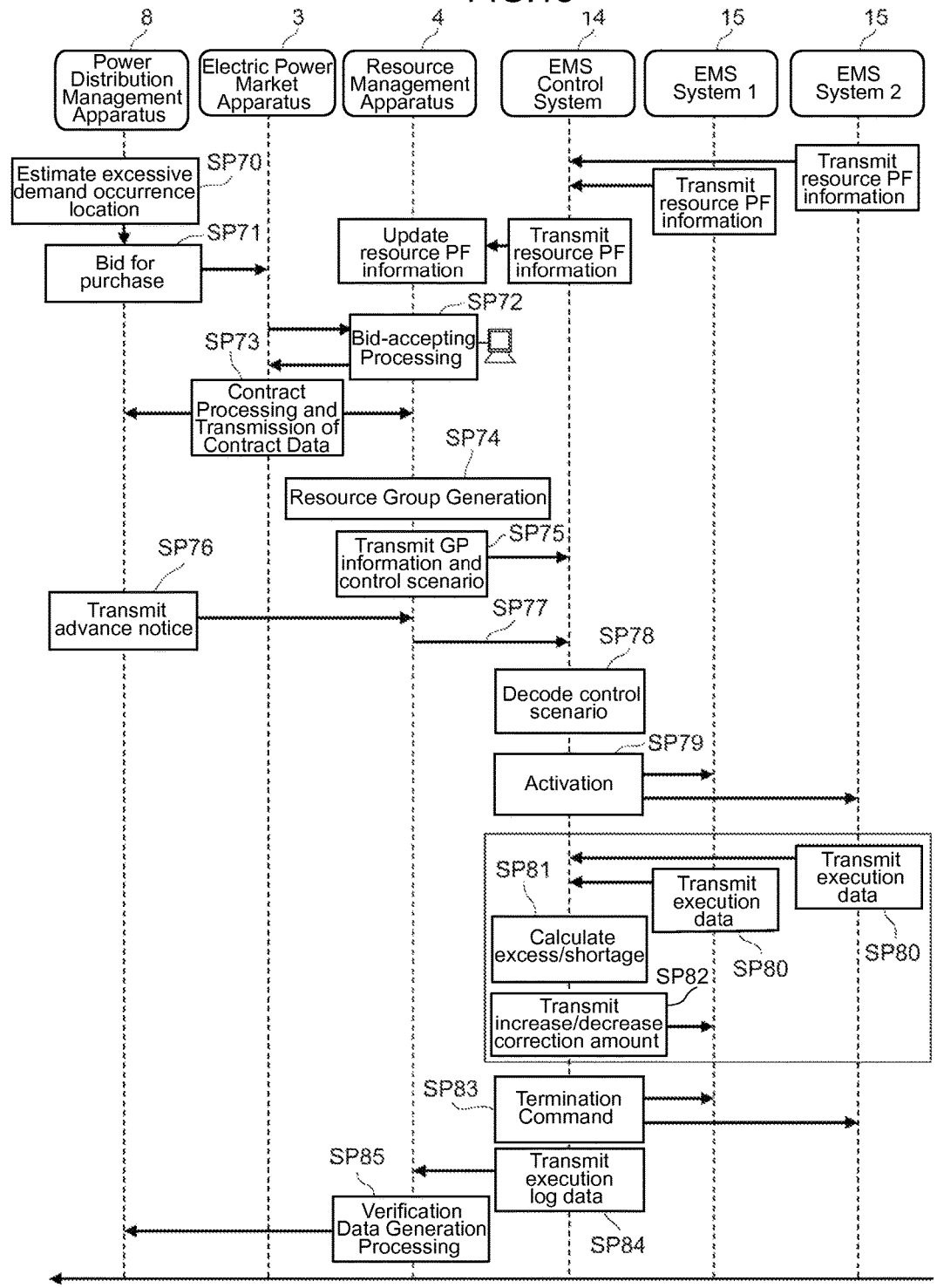
FIG. 18 is a tag chart illustrating a flow of negawatt trading between the aggregator and a power distribution management provider.

FIG. 17 illustrates a processing sequence executed when the electric power retailer 5 tenders a bid to buy the electric power product in the electric power market and the aggregator 2 accepts the bid for purchase.

The electric power retail apparatus 6 of the electric power retailer 5 estimates insufficient electric energy for each time frame of the entire consumer 20 on the basis of, for example, the weather information and statistics in the past (SP50) and tenders a bid for purchase in the electric power market with respect to the time frame during which the insufficient electric power occurs (SP51).

Furthermore, the electric power retail apparatus 6 judges, at specified timing, whether today is a day when the electric power demand becomes maximum through the year (hereinafter referred to as the "maximum electric power demand day"), on the basis of, for example, the weather information and statistics in the past (SP52); and if the electric power retail apparatus 6 determines that today is the maximum electric power demand day, it tenders the bid for purchase of the amount of electric power, which is estimated to become insufficient in the electric power market, in the electric power market (SP53).

Then, when the resource management apparatus 3 executes the bid-accepting processing in response to this bid for purchase (SP54), the same processing as the processing described earlier with respect to step SP36 to step SP49 in FIG. 16 is then executed (step SP55 to step SP67). In this way, the negawatt trading between the aggregator 2 and the electric power retailer 5 is conducted.

(4-3) Flow of Negawatt Trading Between Aggregator and Power Distribution Management Provider When the demand occurs to cause an electric current to flow in excess of the capacity of the electric wire, the power distribution management apparatus 8 of the power distribution management provider 7 (FIG. 1) suppresses the flow of the electric current through the electric wire in excess of the capacity of the relevant electric wire by tendering a bid for purchase of the excessive electric current amount of the electric power in the electric power market.

FIG. 8 illustrates a processing sequence executed when the power distribution management provider 7 tenders a bid to buy the electric power product in the electric power market as described above and the aggregator 2 accepts the bid for purchase.

When the power distribution management apparatus 8 of the power distribution management provider 7 detects that the quantity of electric current flowing through an electric wire in any of areas exceeds the capacity of that electric wire, it tenders a bid to buy the electric power according to the excessive amount of electric current in the electric power market.

Then, when the resource management apparatus 3 executes the bid-accepting processing in response to this bid for purchase, the same processing as the processing described earlier with respect to step SP36 to step SP49 in FIG. 16 is then executed (step SP73 to step SP85). In this way, the negawatt trading between the aggregator 2 and the power distribution management provider 7 is executed.

(5) Advantageous Effects of this Embodiment

With the electric power trading system 1 according to this embodiment as described above, the resource management apparatus 3: retains the resource profile 53 for each resource RS, in which, for example, the information about the characteristics of the resource RS and the information about the demand response program contract executed between the aggregator 2 (FIG. 1) and the consumer 20 (FIG. 1) with respect to that resource RS are described; generates the resource group RG capable of creating the negawatts or posiwatts, which satisfy the conditions of the electric power product, on the basis of the resource profile 53 of each resource RS; and controls each resource RS constituting this resource group RG in accordance with the control scenario 54. So, the negawatts or posiwatts which meet various demands in the electric power market can be created and provided easily and in short time. Therefore, it is possible to suppress destabilization of the electric power demand balance and expansion of volatility of the electric power prices due to expansion of the electric power generation by the regenerated energy.

(6) Other Embodiments

Incidentally, the aforementioned embodiment has described the case in which the present invention is applied to the electric power trading system 1 configured as illustrated in FIG. 1; however, the present invention is not limited to this example and can be widely applied to electric power trading systems having various other configurations.

Moreover, the aforementioned embodiment has described the case in which the resource management apparatus 3 and the EMS control system 4 are configured separately; however, the present invention is not limited to this example and these functions may be mounted in one device (for example, a computer device).

Furthermore, the aforementioned embodiment has described the case in which the resource profile 53 to be used when creating negawatts and the resource profile 53 to be used when creating posiwatts are used in combination; however, the present invention is not limited to this example and they may be prepared separately and stored in the storage apparatus 43 and the resource profile 53 for negawatts may be used when creating the negawatts and the resource profile 53 for posiwatts may be used when creating the posiwatts. Incidentally, since practically the characteristics of the resources RS, such as the lamp period, when creating the negawatts are different from the characteristics of the resources RS, such as the lamp period, when creating the posiwatts, it is necessary to prepare the resource profile 53 to be used when creating the negawatts and the resource profile 53 to be used when creating the posiwatts separately.

INDUSTRIAL APPLICABILITY

The present invention can be applied to the electric power trading system.

REFERENCE SIGNS LIST

1 Electric power trading system; 2 aggregator; 3 resource management apparatus; 4 EMS control system; 5 electric power retailer; 6 electric power retail apparatus; 7 power distribution management provider; 8 power distribution management apparatus; 9 transmission system operator; 10 central power command apparatus; 12 electric power market apparatus; 13 power producer; 14 power generator; 20; 20A to 20D consumers; 23A to 23D heat source devices; 24, 24A to 24D EMS's; 41, 61, 111A, 111B CPU's; 51 resource group generation program; 52 control scenario selection program; 53 resource profile; 54 control scenario; 55 electric power product profile; 68 control command program; 117A HP control parameter change program; 117B CHP control parameter change program; 120 resource group generation unit; 123 control command unit; RG resource group; and RS resource.

The invention claimed is:
1. An electric power creation control system for creating electric power by controlling operation of resources of each consumer who has made a contract with an aggregator, the electric power creation control system comprising:
a storage device that stores a profile of each of the resources, in which information about characteristics of the resources when creating negawatts by decreasing electric power consumption of the resources or creating posiwatts by increasing the electric power consumption of the resources, and information about contract content between the aggregator and the relevant consumer are described, and a plurality of control scenarios created in advance, each control scenario for a corresponding electric power trading form in which control content of the resources to decrease or increase the electric power consumption is described;
a resource group generation unit that generates a resource group composed of the plurality of resources by combining the resources so that the negawatts or posiwatts which satisfy conditions of a trading target electric power product can be created, on the basis of the profile of each resource;
a control scenario selection unit that selects, from the plurality of control scenarios stored in the storage device, a control scenario corresponding to the trading form of the electric power product for the resource group generated by the resource group generation unit; and
a control unit that controls each of the resources constituting the resource group generated by the resource group generation unit in accordance with the selected control scenario selected by the control scenario selection unit;
wherein the conditions of the electric power product include at least: a quantity that is electric energy of the electric power product; start time of a time slot to sell the electric power product; and a ramp period that is a period of time from the start time until the electric energy reaches the quantity;

wherein the profile describes the ramp period which is a period of time from the electric power consumption actually starts to decrease or increase until a decreased amount or an increased amount of the electric power consumption reaches a target value;

wherein the resource group generation unit generates the resource group based on the profile of each of the resources; and wherein the conditions of the electric power product include (i) an advance notice time which is a period of time from a time at which advance notice is made by a buyer of the electric power product before the start time until the start time, and (ii) a duration of the electric power product during which the electric power product is provided, and wherein the electric power creation control system, further comprising:

dividing the electric power product into a plurality of electric power products based on at least one of time slots or electric energy;

judging whether or not the advance notice time of the negawatts or posiwatts created by the resource group matches the advance notice time of the divided electric power product; and if there is no match, replacing a resource in the resource group with another resource selected to bring the advance notice time of the negawatts or posiwatts created by the resource group closer to the advance notice time of the divided electric power product.

2. The electric power creation control system according to claim 1, wherein the profile describes, as further information about the characteristics of the relevant resource, at least lead time which is a period of time from control of operation of the resource is started until the electric power consumption actually starts to decrease or increase, and an assumed controlled variable which is the electric power consumption decreased or increased by operation control of the resource; and wherein the resource group generation unit generates the resource group based on the profile of each of the resources.

3. The electric power creation control system according to claim 1, wherein the profile describes, as information about contract content between the aggregator and the relevant consumer, at least a controllable time slot that is a time slot during which the operation of the relevant resource predetermined by the aggregator with the consumer can be controlled, and possible control duration that is a period of time during which the operation of the resource can be continuously controlled; and wherein the resource group generation unit generates the resource group by combining a plurality of the resources from among the resources, whose operation can be controlled during the time slot of the electric power product, on the basis of the profile of each resource.

4. The electric power creation control system according to claim 3, wherein the profile describes, as information about the contract content between the aggregator and the relevant consumer, a price per unit electric energy to be paid to the consumer for the negawatts or the posiwatts created by the operation control of the relevant resource; and wherein the resource group generation unit generates the resource group by preferentially combining the resources, regarding which a licensing fee to be paid to the consumer is low, on the basis of the profile of each resource whose operation can be controlled during the time slot of the electric power product.

5. The electric power creation control system according to claim 4, wherein the control unit:

calculates total quantity of the negawatts then created on the basis of the electric energy of the negawatts created by the operation control which is transmitted respectively from each resource whose operation is controlled in accordance with the selected control scenario;

compares the calculated total quantity of the negawatts with the electric energy of the electric power product;

calculates an excessive amount or insufficient amount of the electric energy when it is determined that the total quantity of the then created negawatts does not match the electric energy of the electric power product; and controls the operation of some or all the resources constituting the relevant resource group so that the total quantity of the then created negawatts will be decreased or increased by the calculated excessive amount or insufficient amount of the electric energy.

6. An electric power creation control method executed at an electric power creation control system for creating electric power by controlling operation of resources of each consumer who has made a contract with an aggregator, wherein the electric power creation control system includes a storage device that stores a profile of each of the resources, in which information about characteristics of the resources when creating negawatts by decreasing electric power consumption of the resources or creating posiwatts by increasing the electric power consumption of the resources, and information about contract content between the aggregator and the relevant consumer are described, and a plurality of control scenarios created in advance, each control scenario for a corresponding electric power trading form in which control content of the resources to decrease or increase the electric power consumption is described, the electric power creation control method comprising:

a first step executed by the electric power creation control system generating a resource group composed of the plurality of resources by combining the resources so that the negawatts or posiwatts which satisfy conditions of a trading target electric power product can be created, on the basis of the profile of each resource, and selecting, from the plurality of control scenarios stored in the storage device, a control scenario corresponding to the trading form of the electric power product for the resource group; and a second step executed by electric power creation control system controlling each of the resources constituting the generated resource group in accordance with the selected control scenario;

wherein the conditions of the electric power product include at least: a quantity that is electric energy of the electric power product; start time of a time slot to sell the electric power product; and a ramp period that is a period of time from the start time until the electric energy reaches the quantity;

wherein the profile of at least one of the resources describes the ramp period which is a period of time from the electric power consumption actually starts to decrease until a decreased amount of the electric power consumption reaches a target value; and wherein the profile of at least one of the resources describes the ramp period which is a period of time from the electric power consumption actually starts to increase until an increased amount of the electric power consumption reaches another target value;

wherein in the first step, the electric power creation control system generates the resource group based on the profile of each of the resources; and wherein the conditions of the electric power product include (i) an advance notice time which is a period of time from a time at which advance notice is made by a buyer of the electric power product before the start time until the start time, and (ii) a duration of the electric power product during which the electric power product is provided, and wherein the resource group generation unit divides the electric power product into a plurality of electric power products based on at least one of time slots or electric energy, judges whether or not the advance notice time of the negawatts or posiwatts created by the resource group matches the advance notice time of the divided electric power product, and, if there is no match, replaces a resource in the resource group with another resource selected to bring the advance notice time of the negawatts or posiwatts created by the resource group closer to the advance notice time of the divided electric power product.

7. The electric power creation control method according to claim 6, wherein the profile describes, as further information about the characteristics of the relevant resource, at least lead time which is a period of time from control of operation of the resource is started until the electric power consumption actually starts to decrease or increase, and an assumed controlled variable which is the electric power consumption decreased or increased by operation control of the resource; and wherein in the first step, the electric power creation control system generates the resource group based on the profile of each of the resources.

8. The electric power creation control method according to claim 6, wherein the profile describes, as information about contract content between the aggregator and the relevant consumer, at least a controllable time slot that is a time slot during which the operation of the relevant resource predetermined by the aggregator with the consumer can be controlled, and possible control duration that is a period of time during which the operation of the resource can be continuously controlled; and wherein in the first step, the electric power creation control system generates the resource group by combining a plurality of the resources from among the resources, whose operation can be controlled during the time slot of the electric power product, on the basis of the profile of each resource.

9. The electric power creation control method according to claim 8, wherein the profile describes, as information about the contract content between the aggregator and the relevant consumer, a price per unit electric energy to be paid to the consumer for the negawatts or the posiwatts created by the operation control of the relevant resource; and wherein in the first step, the electric power creation control system generates the resource group by preferentially combining the resources, regarding which a licensing fee to be paid to the consumer is low, on the basis of the profile of each resource whose operation can be controlled during the time slot of the electric power product.

10. The electric power creation control method according to claim 9, wherein in the second step, the electric power creation control system:

calculates total quantity of the negawatts then created on the basis of the electric energy of the negawatts created by the operation control which is transmitted respectively from each resource whose operation is controlled in accordance with the selected control scenario;

compares the calculated total quantity of the negawatts with the electric energy of the electric power product;

calculates an excessive amount or insufficient amount of the electric energy when it is determined that the total quantity of the then created negawatts does not match the electric energy of the electric power product; and controls the operation of some or all the resources constituting the relevant resource group so that the total quantity of the then created negawatts will be decreased or increased by the calculated excessive amount or insufficient amount of the electric energy.

11. The electric power creation control system according to claim 1, wherein the selected control scenario defines control to create the negawatts or posiwatts that meet a definition of the electric power product in response to information of the resource group generated by the resource group generation unit and designation of an electric power product profile, by using the resources designated by the resource group generated by the resource group generation unit; and wherein the electric power product profile is metadata in which content of the electric power product that the aggregator tenders a bid for sale is described.

12. The electric power creation control system according to claim 11, wherein when the negawatts created by the resource group are inconsistent with the definition in the electric power product profile with respect to any specific resource of the resources, the control unit makes a definition to issue a command to perform control driving to correct the inconsistency.

13. The electric power creation control system according to claim 12, wherein the control unit determines PID control parameters to correct the inconsistency with reference to the resource group and the characteristics of the specific resource and by a gain control method by means of Nyquist diagram analysis.

14. The electric power creation control system according to claim 11, wherein the selected control scenario defines control to create the negawatts or posiwatts that meet the definition of the electric power product by satisfying the conditions of the electric power product on the basis of the profile of each resource in the resource group generated by the resource group generation unit.

15. The electric power creation control method according to claim 6, wherein the first step includes:

defining control to create the negawatts or posiwatts that meet a definition of the electric power product in response to information of the resource group generated by the resource group generation unit and designation of an electric power product profile, by using the resources designated by the resource group generated by the resource group generation unit; and wherein the electric power product profile is metadata in which content of the electric power product that the aggregator tenders a bid for sale is described.

16. The electric power creation control method according to claim 15, further comprising:

when the negawatts created by the resource group are inconsistent with the definition in the electric power product profile with respect to any specific resource of the resources, making a definition to issue a command to perform control driving to correct the inconsistency.

17. The electric power creation control method according to claim 16, further comprising:

determining PID control parameters to correct the inconsistency with reference to the resource group and the characteristics of the specific resource and by a gain control method by means of Nyquist diagram analysis.

18. The electric power creation control method according to claim 15, wherein the selected control scenario defines control to create the negawatts or posiwatts that meet the definition of the electric power product by satisfying the conditions of the electric power product on the basis of the profile of each resource in the resource group generated by the resource group generation unit.

* * * * *